(12) United States Patent
Ma et al.

(10) Patent No.: US 11,018,729 B2
(45) Date of Patent: May 25, 2021

(54) STRUCTURED-PIPELINED CORDIC FOR MATRIX EQUALIZATION

(71) Applicant: NXP USA, Inc., Austin, TX (US)

(72) Inventors: Yong Ma, San Jose, CA (US); Kai Cheong Tang, Cupertino, CA (US); Chao Shan, Milpitas, CA (US); Mao Yu, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/876,261

(22) Filed: May 18, 2020

(65) Prior Publication Data

US 2020/0373970 A1 Nov. 26, 2020

Related U.S. Application Data

(60) Provisional application No. 62/850,980, filed on May 21, 2019.

(51) Int. Cl.

| | |
|---|---|
| *H04K 1/10* | (2006.01) |
| *H04L 27/28* | (2006.01) |
| *H04B 7/0413* | (2017.01) |
| *G06F 7/544* | (2006.01) |
| *G06F 7/48* | (2006.01) |
| *H04L 27/26* | (2006.01) |
| *H04L 27/00* | (2006.01) |
| *H04B 7/06* | (2006.01) |
| *H04L 25/03* | (2006.01) |

(52) U.S. Cl.
CPC ......... *H04B 7/0413* (2013.01); *G06F 7/4818* (2013.01); *G06F 7/5446* (2013.01); *H04B 7/066* (2013.01); *H04L 27/0014* (2013.01); *H04L 27/2657* (2013.01); *H04L 27/2675* (2013.01); *H04L 2025/03426* (2013.01); *H04L 2027/003* (2013.01)

(58) Field of Classification Search
CPC ..... H04B 7/0413; H04B 7/066; G06F 7/5446; G06F 7/4818; H04L 27/2657; H04L 27/0014; H04L 27/2675; H04L 2025/03426; H04L 2027/003
USPC ................................ 375/260, 316, 346, 229
See application file for complete search history.

(56) References Cited

U.S. PATENT DOCUMENTS

| | | | |
|---|---|---|---|
| 7,616,695 | B1 | 11/2009 | Sarrigeorgidis |
| 8,077,805 | B1 | 12/2011 | Sarrigeorgidis |
| (Continued) | | | |

OTHER PUBLICATIONS

Ercegovac, M., and Lang, T., "Digital Arithmetic—1st Edition," Chapter 11, Morgan Kaufmann, Jun. 10, 2003, 36 pages.

(Continued)

*Primary Examiner* — Phuong Phu

(57) ABSTRACT

Flexible structured-pipelined CORDIC techniques efficiently perform various CORDIC operations and support different parameters for MIMO MEQ processing. The structured-pipelined CORDIC techniques simplify signal processing flow, unify input requirements and output delay, and simplify integration. Look-up table techniques provide quick generation of control signals, reduce design and verification efforts, and facilitate design automation. In addition, the structured-pipelined CORDIC techniques are conducive to hardware sharing and reuse. The structured-pipelined CORDIC techniques reduce integrated circuit area and power consumption.

20 Claims, 14 Drawing Sheets

(56) References Cited

U.S. PATENT DOCUMENTS

| | | | |
|---|---|---|---|
| 8,204,103 B1 | 6/2012 | Sarrigeorgidis | |
| 8,223,872 B1 | 7/2012 | Zhang et al. | |
| 8,699,556 B1 | 4/2014 | Sarrigeorgidis | |
| 10,505,599 B1 | 12/2019 | Shan et al. | |
| 2017/0117944 A1* | 4/2017 | Ram | H04B 7/0413 |

OTHER PUBLICATIONS

Lambers, J., "The QR Factorization," MAT 610, Summer Session Oct. 2009, Lecture Notes, pp. 1-12.

* cited by examiner

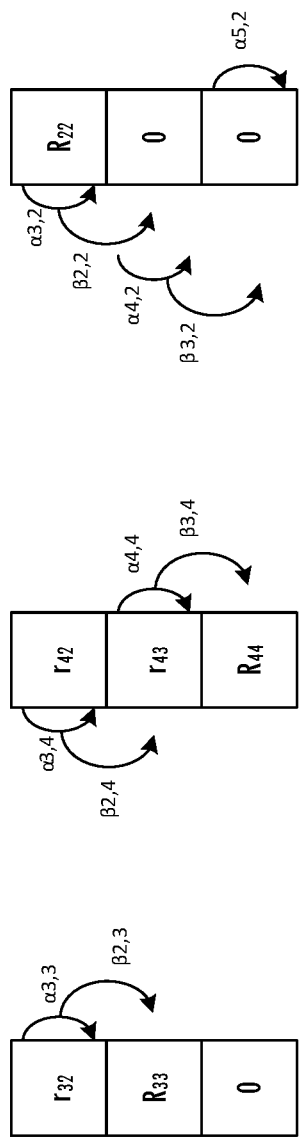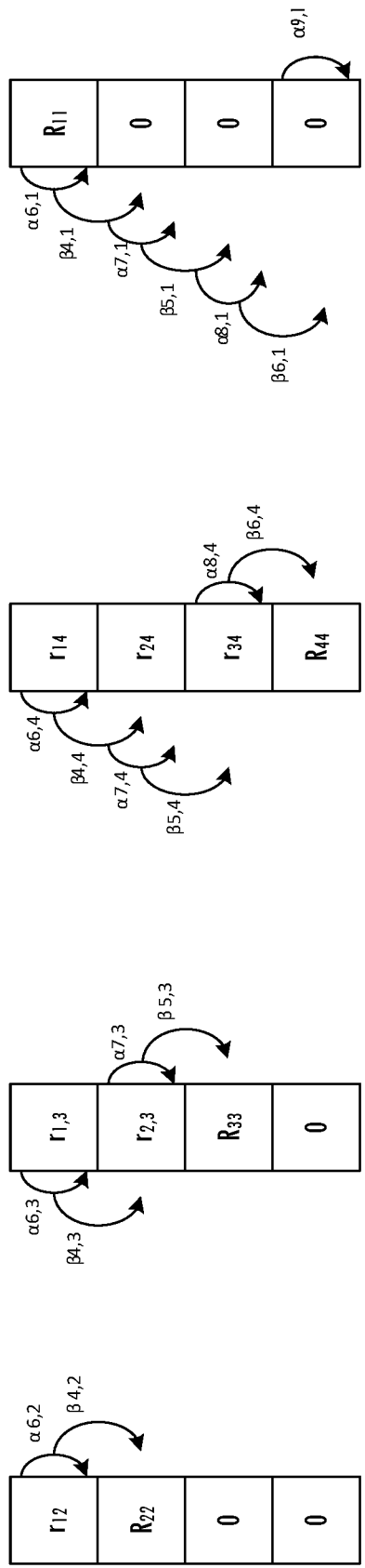
FIG. 5
FIG. 6

| SPC Cyc | 0 | 1 | 2 | 3 | 4 | 5 | 6 | 7 |
|---|---|---|---|---|---|---|---|---|
| BST Cnt | | 0 | | | | 1 | | |
| R-use Cyc | 0 | 1 | 2 | 3 | 0 | 1 | 2 | 3 |
| 1 | φ1,1 | φ1,2 | φ1,3 | φ1,4 | φ1,1 | φ1,2 | φ1,3 | φ1,4 |
| 2 | φ2,1 | φ2,2 | φ2,3 | φ2,4 | φ2,1 | φ2,2 | φ2,3 | φ2,4 |
| 3 | φ3,1 | φ3,2 | φ3,3 | φ3,4 | φ3,1 | φ3,2 | φ3,3 | φ3,4 |
| 4 | φ4,1 | φ4,2 | φ4,3 | φ4,4 | φ4,1 | φ4,2 | φ4,3 | φ4,4 |
| 5 | | θ1,1 | θ1,2 | θ1,3 | θ1,4 | θ1,1 | θ1,2 | θ1,3 |
| 6 | | | θ1,2 | θ1,3 | θ1,4 | θ1,1 | θ1,2 | θ1,3 |
| 7 | | θ2,1 | θ2,2 | θ2,3 | θ2,4 | θ2,1 | θ2,2 | θ2,3 |
| 8 | | | θ2,2 | θ2,3 | θ2,4 | θ2,1 | θ2,2 | θ2,3 |
| 9 | | | θ3,1 | | θ3,3 | θ3,4 | θ3,1 | θ3,2 |
| 10 | | | | θ3,2 | θ3,3 | θ3,4 | θ5,3 | θ3,2 |
| 11 | | | | φ5,2 | φ5,3 | φ5,4 | θ4,4 | φ5,2 |
| 12 | | | | φ6,2 | φ6,3 | φ6,4 | θ4,4 | φ6,2 |
| 13 | | | | | φ7,2 | φ7,3 | φ7,4 | φ5,4 |
| 14 | | | | | φ4,2 | φ5,2 | φ5,3 | φ5,4 |
| 15 | | | | | | | | φ8,3 |
| 16 | | | | | | | | φ9,3 |

FIG. 11A

| SPC Cyc | 8 | 9 | 10 | 11 | 12 | 13 | 14 | 15 | 16 |
|---|---|---|---|---|---|---|---|---|---|
| BST Cnt | | 2 | | | | | 3 | | |
| R-use Cyc | 0 | 1 | 2 | 3 | 0 | 1 | 2 | 3 | 0 |
| 1 | ɸ1,1 | ɸ1,2 | ɸ1,3 | ɸ1,4 | ɸ1,1 | ɸ1,2 | ɸ1,3 | ɸ1,4 | ɸ1,1 |
| 2 | ɸ2,1 | ɸ2,2 | ɸ2,3 | ɸ2,4 | ɸ2,1 | ɸ2,2 | ɸ2,3 | ɸ2,4 | ɸ2,1 |
| 3 | ɸ3,1 | ɸ3,2 | ɸ3,3 | ɸ3,4 | ɸ3,1 | ɸ3,2 | ɸ3,3 | ɸ3,4 | ɸ3,1 |
| 4 | ɸ4,1 | ɸ4,2 | ɸ4,3 | ɸ4,4 | ɸ4,1 | ɸ4,2 | ɸ4,3 | ɸ4,4 | ɸ4,1 |
| 5 | θ1,4 | θ1,1 | θ1,2 | θ1,3 | θ1,4 | θ4,3 | θ1,2 | θ1,3 | θ1,4 |
| 6 | θ1,4 | θ4,3 | θ1,2 | θ1,3 | θ1,4 | θ2,1 | θ1,2 | θ1,3 | θ2,4 |
| 7 | θ2,4 | θ2,1 | θ2,2 | θ2,3 | θ2,4 | θ4,3 | θ2,2 | θ2,3 | θ2,4 |
| 8 | θ2,4 | θ4,3 | θ2,2 | θ2,3 | θ3,3 | θ3,4 | θ3,1 | θ3,2 | θ3,3 |
| 9 | θ3,3 | θ3,4 | θ3,1 | θ3,2 | θ3,3 | θ5,4 | θ5,3 | θ3,2 | θ3,3 |
| 10 | θ3,3 | θ5,4 | θ5,3 | ɸ5,2 | ɸ5,3 | ɸ5,4 | ɸ4,4 | ɸ5,2 | ɸ5,3 |
| 11 | ɸ5,3 | ɸ5,4 | ɸ4,4 | ɸ6,2 | ɸ6,3 | ɸ6,4 | ɸ4,4 | ɸ6,2 | ɸ6,3 |
| 12 | ɸ6,3 | ɸ6,4 | ɸ4,4 | ɸ5,4 | ɸ7,2 | ɸ7,3 | ɸ7,4 | ɸ5,4 | ɸ7,2 |
| 13 | ɸ7,2 | ɸ7,3 | ɸ7,4 | ɸ5,4 | ɸ4,2 | ɸ5,2 | ɸ5,3 | ɸ5,4 | ɸ4,2 |
| 14 | θ4,2 | θ5,2 | θ5,3 | θ8,3 | θ6,3 | θ8,4 | θ6,4 | θ8,3 | θ6,3 |
| 15 | θ6,3 | θ8,4 | θ6,4 | θ9,3 | θ10,4 | θ9,4 | θ6,4 | θ9,3 | θ10,4 |
| 16 | | θ9,4 | θ6,4 | | | | | | |

FIG. 11B

| SPC Cyc | 11 | 12 | 13 | 14 | 15 | 16 | 17 | 18 | 19 |
|---|---|---|---|---|---|---|---|---|---|
| BST Cnt | 2 | 3 | | | | 4 | | | |
| R-use Cyc | 3 | 0 | 1 | 2 | 3 | 0 | 1 | 2 | 3 |
| | | | | | 2nd Permutation | | | | |
| 17 | α1,4 | β1,4 | β1,3 | | α1,4 | β1,4 | β1,3 | | α1,4 |
| 18 | | α1,3 | β1,3 | α2,3 | | α1,3 | β1,3 | α2,3 | |
| | | | | | 3rd Permutation | | | | |
| 19 | α3,3 | β2,3 | β2,4 | β2,2 | α3,3 | β2,3 | β2,4 | β2,2 | α3,3 |
| 20 | | α3,4 | β2,4 | β2,2 | | α3,4 | β2,4 | β2,2 | |
| 21 | | | α3,2 | α4,4 | β3,4 | β3,2 | α3,2 | α4,4 | β3,4 |
| 22 | | | | | α4,2 | β3,2 | α5,2 | | α4,2 |
| | | | | | 4th Permutation | | | | |
| 23 | α6,2 | β4,2 | β4,3 | β4,4 | α6,2 | β4,2 | β4,3 | β4,4 | α6,2 |
| 24 | | α6,3 | β4,3 | β4,4 | β5,3 | α6,3 | β4,3 | β4,4 | β5,3 |
| 25 | | | α6,4 | β4,1 | α7,4 | β5,1 | α6,4 | β4,1 | α7,4 |
| 26 | | | α6,1 | β4,1 | | β5,1 | α6,1 | β4,1 | α8,1 |
| 27 | | | | α7,3 | α7,1 | β5,4 | | α7,3 | α7,1 |
| 28 | | | | | | β5,4 | | α8,4 | β6,4 |

FIG. 11C

| SPC Cyc | BST Cnt | R-use Cyc | 20 | 21 | 22 | 23 | 24 | 25 | 26 |
|---|---|---|---|---|---|---|---|---|---|
| | | | | | 2nd Permutation | | | | |
| | 5 | | | | | | | | |
| 17 | | 0 | β1,4 | β1,3 | | α1,4 | β1,4 | β1,3 | |
| 18 | | 1 | α1,3 | β1,3 | α2,3 | | α1,3 | β1,3 | α2,3 |
| | | | | | 3rd Permutation | | | | |
| 19 | | | β2,3 | β2,4 | β2,2 | α3,3 | β2,3 | β2,4 | β2,2 |
| 20 | | | α3,4 | β2,4 | β2,2 | | α3,4 | β2,4 | β2,2 |
| 21 | | | β3,2 | α3,2 | α4,4 | β3,4 | β3,2 | α3,2 | α4,4 |
| 22 | | | β3,2 | α5,2 | α9,1 | α4,2 | β3,2 | α5,2 | α9,1 |
| | | | | | 4th Permutation | | | | |
| 23 | | | β4,2 | β4,3 | β4,4 | α6,2 | β4,2 | β4,3 | β4,4 |
| 24 | | | α6,3 | β4,3 | β4,4 | β5,3 | α6,3 | β4,3 | β4,4 |
| 25 | 6 | | β5,4 | α6,4 | β4,1 | α7,4 | β5,4 | α6,4 | β4,1 |
| 26 | | | β5,4 | α6,1 | β4,1 | α8,1 | β5,4 | α6,1 | β4,1 |
| 27 | | | β5,1 | β6,1 | α7,3 | α7,1 | β5,1 | β6,1 | α7,3 |
| 28 | | | β5,1 | β6,1 | α8,4 | β6,4 | β5,1 | β6,1 | α8,4 |

FIG. 11D

| SPC cyc | 0 | 1 | 2 | 3 | 4 | 5 | 6 | 7 |
|---|---|---|---|---|---|---|---|---|
| BST Cnt | 0 | | | | | 1 | | | |
| R-use Cyc | 0 | 1 | 2 | 3 | 0 | 1 | 2 | 3 |
| 1 | Φ1,1 | Φ1,2 | 2 | 3 | Φ1,1 | Φ1,2 | 2 | 3 |
| 2 | Φ2,1 | Φ2,2 | EN0 | EN0 | Φ2,1 | Φ2,2 | EN0 | EN0 |
| 3 | Φ3,1 | Φ3,2 | EN0 | EN0 | Φ3,1 | Φ3,2 | EN0 | EN0 |
| 4 | EN0 | Θ1,1 | Θ1,2 | EN0 | EN0 | Θ1,1 | Θ1,2 | EN0 |
| 5 | EN0 | EN0 | Θ1,2 | EN0 | EN0 | EN0 | BP | EN0 |
| 6 | EN0 | BP | BP | EN0 | EN0 | BP | BP | EN0 |
| 7 | EN0 | EN0 | Θ3,1 | Θ3,2 | EN0 | EN0 | Θ3,1 | Θ3,2 |
| 8 | EN0 | EN0 | EN0 | Θ3,2 | Θ2,2 | EN0 | Θ5,3 | Θ3,2 |
| 9 | EN0 | EN0 | EN0 | Θ5,2 | BP | Θ5,2 | EN0 | Φ5,2 |
| 10 | EN0 | EN0 | EN0 | EN0 | EN0 | EN0 | EN0 | EN0 |
| 11 | EN0 | EN0 | EN0 | EN0 | EN0 | EN0 | EN0 | EN0 |
| 12 | EN0 | EN0 | EN0 | EN0 | EN0 | EN0 | EN0 | EN0 |
| 13 | EN0 | EN0 | EN0 | EN0 | EN0 | EN0 | EN0 | EN0 |
| 14 | EN0 | EN0 | EN0 | EN0 | EN0 | EN0 | EN0 | EN0 |
| 15 | EN0 | EN0 | EN0 | EN0 | EN0 | EN0 | EN0 | EN0 |
| 16 | EN0 | EN0 | EN0 | EN0 | EN0 | EN0 | EN0 | EN0 |

FIG. 12A

| SPC cyc | 8 | 9 | 10 | 11 | 12 | 13 | 14 | 15 | 16 |
|---|---|---|---|---|---|---|---|---|---|
| BST Cnt | 2 | | | | 3 | | | | |
| R-use Cyc | 0 | 1 | 2 | 3 | 0 | 1 | 2 | 3 | 0 |
| 1 | φ1,1 | φ1,2 | EN0 | EN0 | φ1,1 | φ1,2 | EN0 | EN0 | φ1,1 |
| 2 | φ2,1 | φ2,2 | EN0 | EN0 | φ2,1 | φ2,2 | EN0 | EN0 | φ2,1 |
| 3 | φ3,1 | φ3,2 | EN0 | EN0 | φ3,1 | φ3,2 | EN0 | EN0 | φ3,1 |
| 4 | EN0 | EN0 | EN0 | EN0 | EN0 | EN0 | EN0 | EN0 | EN0 |
| 5 | EN0 | Θ1,1 | Θ1,2 | EN0 | EN0 | Θ1,1 | Θ1,2 | EN0 | EN0 |
| 6 | EN0 | EN0 | Θ1,2 | EN0 | EN0 | EN0 | Θ1,2 | EN0 | EN0 |
| 7 | EN0 | BP | BP | EN0 | EN0 | BP | BP | EN0 | EN0 |
| 8 | EN0 | EN0 | EN0 | EN0 | EN0 | BP | EN0 | EN0 | EN0 |
| 9 | EN0 | EN0 | Θ3,1 | Θ3,2 | EN0 | EN0 | Θ3,1 | EN0 | EN0 |
| 10 | EN0 | EN0 | EN0 | Θ3,2 | EN0 | EN0 | EN0 | Θ3,2 | EN0 |
| 11 | EN0 | EN0 | EN0 | φ5,2 | EN0 | EN0 | EN0 | φ5,2 | EN0 |
| 12 | EN0 | EN0 | EN0 | EN0 | EN0 | EN0 | EN0 | EN0 | EN0 |
| 13 | φ7,2 | EN0 | EN0 | EN0 | φ7,2 | EN0 | EN0 | EN0 | φ7,2 |
| 14 | BP | φ5,2 | EN0 | EN0 | BP | φ5,2 | EN0 | EN0 | BP |
| 15 | EN0 | EN0 | EN0 | EN0 | EN0 | EN0 | EN0 | EN0 | EN0 |
| 16 | EN0 | EN0 | EN0 | EN0 | EN0 | EN0 | EN0 | EN0 | EN0 |

FIG. 12B

| SPC Cyc | 0 | 1 | 2 | 3 | 4 | 5 | 6 | 7 |
|---|---|---|---|---|---|---|---|---|
| BST Cnt | 0 | | | | 1 | | | |
| R-use Cyc | 0 | 1 | 2 | 3 | 0 | 1 | 2 | 3 |
| 1 | 1000 | 1100 | EN0 | EN0 | 1000 | 1100 | EN0 | EN0 |
| 2 | 1000 | 1100 | EN0 | EN0 | 1000 | 1100 | EN0 | EN0 |
| 3 | 1000 | 1100 | EN0 | EN0 | 1000 | 1100 | EN0 | EN0 |
| 4 | EN0 | EN0 | EN0 | EN0 | EN0 | EN0 | EN0 | EN0 |
| 5 | EN0 | 1000 | 1100 | EN0 | EN0 | 1000 | 1100 | EN0 |
| 6 | EN0 | EN0 | 1100 | 1100 | EN0 | EN0 | 1100 | EN0 |
| 7 | EN0 | 1001 | 1101 | EN0 | EN0 | 1001 | 1101 | EN0 |
| 8 | EN0 | EN0 | 1101 | 1100 | EN0 | EN0 | 1101 | 1100 |
| 9 | EN0 | EN0 | 1000 | 1000 | EN0 | EN0 | 1000 | 1000 |
| 10 | EN0 | EN0 | EN0 | EN0 | 1000 | EN0 | EN0 | 1100 |
| 11 | EN0 | EN0 | EN0 | EN0 | 1001 | EN0 | EN0 | 1000 |
| 12 | EN0 | EN0 | EN0 | EN0 | EN0 | EN0 | EN0 | EN0 |
| 13 | EN0 | EN0 | EN0 | EN0 | 1000 | 1010 | EN0 | EN0 |
| 14 | EN0 | EN0 | EN0 | EN0 | 1001 | EN0 | EN0 | EN0 |
| 15 | EN0 | EN0 | EN0 | EN0 | EN0 | EN0 | EN0 | EN0 |
| 16 | EN0 | EN0 | EN0 | EN0 | EN0 | EN0 | EN0 | EN0 |

FIG. 13A

| SPC Cyc | 8 | 9 | 10 | 11 | 12 | 13 | 14 | 15 | 16 |
|---|---|---|---|---|---|---|---|---|---|
| BST Cnt | | 2 | | | | 3 | | | |
| Reuse Cyc | 0 | 1 | 2 | 3 | 0 | 1 | 2 | 3 | 0 |
| 1 | 1000 | 1100 | ENO | ENO | 1000 | 1100 | ENO | ENO | 1000 |
| 2 | 1000 | 1100 | ENO | ENO | 1000 | 1100 | ENO | ENO | 1000 |
| 3 | 1000 | 1100 | ENO | ENO | 1000 | 1100 | ENO | ENO | 1000 |
| 4 | ENO | ENO | 1100 | ENO | ENO | ENO | 1100 | ENO | ENO |
| 5 | ENO | 1000 | 1101 | ENO | ENO | 1000 | 1101 | ENO | ENO |
| 6 | ENO | 1001 | 1101 | ENO | ENO | 1001 | 1000 | ENO | ENO |
| 7 | ENO | ENO | 1000 | 1000 | ENO | ENO | ENO | ENO | ENO |
| 8 | ENO | ENO | ENO | 1100 | ENO | ENO | ENO | 1100 | ENO |
| 9 | ENO | ENO | ENO | 1100 | 1000 | ENO | ENO | 1100 | ENO |
| 10 | ENO | ENO | ENO | 1000 | 1001 | 1010 | ENO | 1000 | ENO |
| 11 | ENO | ENO | ENO | ENO | ENO | ENO | ENO | ENO | ENO |
| 12 | 1000 | ENO | ENO | ENO | 1000 | 1010 | ENO | ENO | 1000 |
| 13 | 1001 | 1010 | ENO | ENO | 1001 | ENO | ENO | ENO | 1001 |
| 14 | ENO | ENO | ENO | ENO | ENO | ENO | ENO | ENO | ENO |
| 15 | ENO | ENO | ENO | ENO | ENO | ENO | ENO | ENO | ENO |
| 16 | ENO | ENO | ENO | ENO | ENO | ENO | ENO | ENO | ENO |

FIG. 13B

STRUCTURED-PIPELINED CORDIC FOR MATRIX EQUALIZATION

CROSS-REFERENCE TO RELATED APPLICATION(S)

This application claims benefit of provisional application No. 62/850,980, entitled "THE USE OF PIPELINE-STRUCTURED CORDIC FOR ORTHOGONAL FREQUENCY MULTIPLE ACCESS (OFDM) MULTIPLE INPUT MULTIPLE OUTPUT (MIMO) RECEIVER MATRIX EQUALIZATION DESIGN," naming Yong Ma, Kai Cheong Tang, Chao Shan, and Mao Yu as inventors, filed May 21, 2019, which application is incorporated herein by reference in its entirety.

BACKGROUND

Field of the Disclosure

The present disclosure relates generally to signal processing and more particularly to signal processing for communications applications.

Description of the Related Art

In an orthogonal frequency division multiplexing (OFDM) system, a data stream is partitioned into multiple substreams, each of which is transmitted using a different subcarrier frequency (also referred to as subcarrier, tone, frequency tone, frequency bin). A multiple-input multiple-output (MIMO) communications technique uses antenna diversity, spatial diversity, or spatially diverse transmission, i.e., multiple spatially separated transit antennas and multiple spatially separated receiver antennas to improve data rates or link performance. A MIMO receiver estimates the effects of the communication channel and equalizes received signals to recover the information that was transmitted. As data rates increase, the numbers of subcarriers and antennas in the communications system increase, which increases the complexity, area, and power consumption of integrated circuits implementing equalization techniques that satisfy target performance specifications. Accordingly, flexible equalization techniques including power-saving and resource-sharing features are desired.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 5 illustrates exemplary CORDIC operations for a third permutation of the QR decomposition of the channel matrix, consistent with at least one embodiment of the invention.

FIG. 6 illustrates exemplary CORDIC operations for a fourth permutation of the QR decomposition of the channel matrix, consistent with at least one embodiment of the invention.

FIGS. 11A-D illustrate tables of CORDIC operations for QR decomposition of an exemplary 4×4 channel matrix, consistent with at least one embodiment of the invention.

FIGS. 12A and 12B illustrate tables of CORDIC operations for QR decomposition of an exemplary 3×2 channel matrix, consistent with at least one embodiment of the invention.

FIGS. 13A and 13B illustrate look-up tables of encoded control signals for the CORDIC operations for QR decomposition of the exemplary 3×2 channel matrix of FIGS. 12A and 12B, consistent with at least one embodiment of the invention.

The use of the same reference symbols in different drawings indicates similar or identical items.

DETAILED DESCRIPTION

An exemplary communications system (e.g., a wireless local area network communications system compliant with an Institute of Electrical and Electronics Engineers (IEEE) 802.11n/ac/ax standard) communicates orthogonal frequency division multiplexed (OFDM) signals using multiple-input multiple-output (MIMO) transceivers. A corresponding receiver includes M receiver antennas and uses matrix equalization techniques for reconstructing the originally transmitted data. A typical MIMO receiver is modelled as:

$$Y_{RX} = H \cdot S_{TX} + n;$$

$$Y_{RX} = \begin{bmatrix} y_1 \\ y_2 \\ \dots \\ y_M \end{bmatrix}, H = \begin{bmatrix} h_{11} & \dots & h_{1N_{ss}} \\ \vdots & \ddots & \vdots \\ h_{M1} & \dots & h_{MN_{ss}} \end{bmatrix}, S_{TX} = \begin{bmatrix} x_1 \\ x_2 \\ \dots \\ x_{N_{ss}} \end{bmatrix};$$

where $Y_{RX}$ denotes received signals $y_1, y_2, \ldots, y_M$ received using M receiver antennas, $S_{TX}$ represents $N_{SS}$ information streams (e.g., spatial streams) $x_1, x_2, \ldots, x_{N_{ss}}$ transmitted by the transmitter, and H denotes an M×$N_{SS}$ channel matrix, which represents effects of the communications channel on the information streams as they are communicated from the transmitter to the receiver, where n is white noise that is ignored for simplification. Typically, M and $N_{SS}$ are integers greater than one and M≥$N_{SS}$.

In general, A MIMO receiver determines channel matrix H based on communication of predetermined information (e.g., HT/VHT/HE-LTF symbols of an exemplary IEEE standard 802.11 compliant packet). The MIMO receiver determines an inverse channel matrix for application to received signals $Y_{RX}$ in order to undo the distortion of the channel and to recover transmitted information $S_{TX}$. Matrix equalization techniques in the receiver determine an inverse channel matrix R for all supported configurations of the communications system, i.e., all supported channel matrices of $M \times N_{SS}$ for variable numbers of receiver antennas M or variable numbers of information streams $N_{SS}$ in a received signal, where $M \geq N_{SS}$, $M \leq M_{MAX}$ and $N \leq N_{SS\_MAX}$, where $M_{MAX}$ is the maximum number of receiver antennas supported by the receiver, and $N_{SS\_MAX}$ is the maximum number of information streams supported by the receiver.

Figure 1:
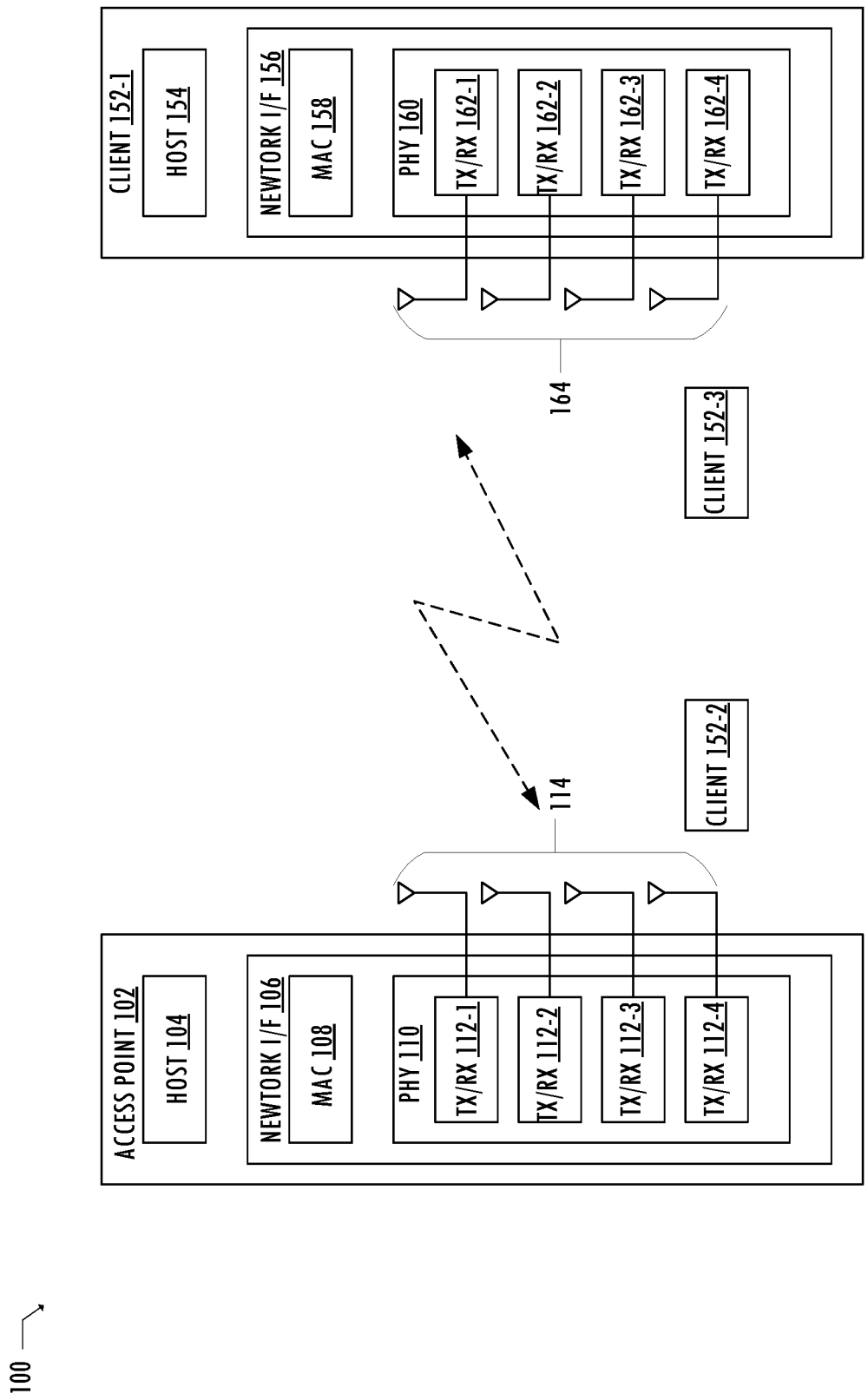
FIG. 1 illustrates a functional block diagram of an exemplary wireless communications system.

Referring to FIG. 1, an exemplary wireless communications system implements wireless local area network (WLAN) 100. WLAN 100 includes access point 102 and clients 152-1, 152-2, and 152-3. Although three clients are illustrated, other numbers of clients may be used. Access point 102 includes host processor 104 coupled to network interface 106. Host processor 104 includes a processor configured to execute machine readable instructions stored in a memory device (not shown), e.g., random access memory (RAM), read-only memory (ROM), a flash memory, or other storage device. Network interface 106 includes medium access control (MAC) processor 108, which is part of a data link layer of an IEEE 802.11 standard-compliant access point, and physical layer (PHY) processor 110. In at least one embodiment, MAC processor 108 or PHY processor 110 are configured to generate data units for transmission and to process received data units that conform to a communications protocol, e.g. a communications protocol compliant with an IEEE 802.11 standard, or other communications protocol. For example, MAC processor 108 is configured to implement MAC layer functions, including MAC layer functions of the WLAN communications protocol and PHY processor 110 is configured to implement PHY data units (MSDUs), MAC protocol data units (MPDUs), etc., and provides the MAC layer data units to PHY processor 110. PHY processor 110 is configured to receive MAC layer data units from MAC processor 108 and to encapsulate those MAC layer data units to generate PHY data units, e.g., PPDUs, for transmission via antennas 114. PHY processor 110 provides the extracted MAC layer data units to MAC processor 108 for processing.

Physical layer processor 110 includes a plurality of transceivers 112-1, 112-2, 112-3, and 112-4, each of which is coupled to a corresponding antenna of antennas 114. Although four antennas and four transceivers are illustrated, other numbers of antennas and transceivers are used in other embodiments of a communications system. Each of transceivers 112-1, 112-2, 112-3, and 112-4 includes a transmitter and a receiver, e.g., mixed-signal and analog circuits and digital signal processing circuits for implementing radio frequency and digital baseband functionality. PHY processor 110 includes at least one amplifier (e.g., low noise amplifier or power amplifier), data converter, and circuits that perform discrete Fourier transform (DFT), inverse discrete Fourier transform (IDFT), modulation, and demodulation. Access point 102 or clients 152-1, 152-2, or 152-3 generate and transmit PPDUs that includes training fields (e.g., data having predetermined values or characteristics) that are used by a receiver to perform synchronization, perform gain control, and estimate channel characteristics for signal equalization. Clients 152-1, 152-2, and 152-3 each include similar circuits (e.g., host processor 154, network interface 156, MAC processor 158, PHY processor 160, transceivers 162-1, 162-2, 162-3, and 162-4, and antennas 164) that provide similar functionality to access point 102 but are adapted to client-side specifications.

Figure 2:
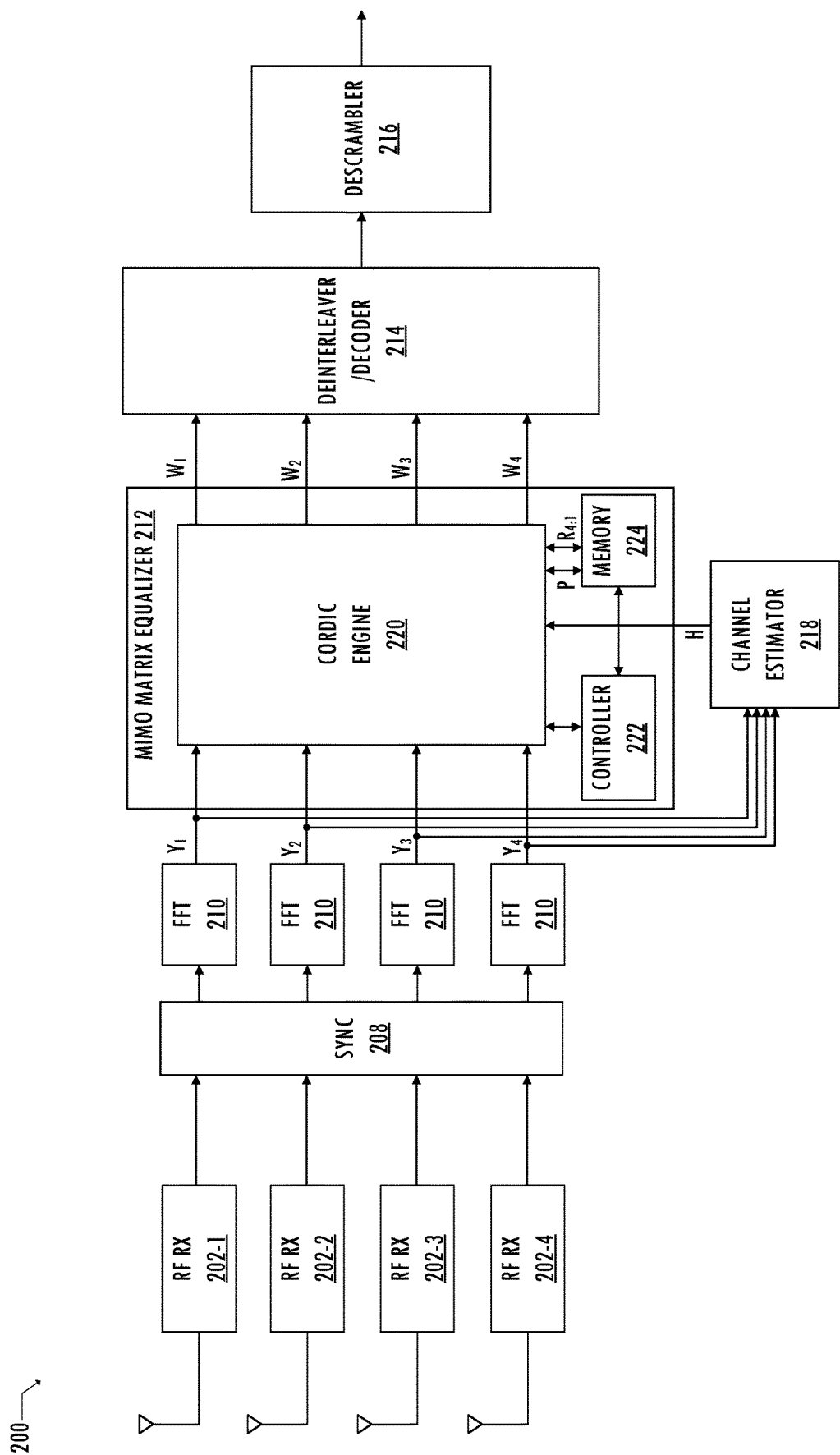
FIG. 2 illustrates a functional block diagram of an exemplary MIMO OFDM receiver.

Referring to FIG. 2, in at least one embodiment of a transceiver, MIMO OFDM receiver 200 includes radio-frequency (RF) receiver interfaces 202-1, 202-2, 202-3, and 202-4 coupled to corresponding antennas and synchronization circuit 208, which synchronizes the received signals. A data portion of each received packet is demodulated by transforming it from a time domain representation to a frequency domain symbol $Y_1$, $Y_2$, $Y_3$, and $Y_4$, by Fast Fourier Transform (FFT) processor 210 and provided to MIMO matrix equalizer (MIMO MEQ) 212, which applies inverse channel matrices to received symbols to compensate for effects of the channel After MIMO matrix equalization, deinterleaver/decoder 214 recovers scrambled data streams, which are descrambled by descrambler 216. Channel estimator 218 generates an $M \times N_{SS}$ channel matrix for each subcarrier of an OFDM signal based on training signals received by MIMO OFDM receiver 200. Each $M \times N_{SS}$ channel matrix is used by MIMO MEQ 212 to generate an inverse channel matrix for the corresponding subcarrier, as described further below. MIMO MEQ 212 applies coefficients of the inverse channel matrices to received symbols $Y_1$, $Y_2$, $Y_3$, and $Y_4$. The coefficients equalize the received signals $Y_1$, $Y_2$, $Y_3$, and $Y_4$, to undo channel distortion that would otherwise corrupt data recovery.

In at least one embodiment, MIMO MEQ 212 operates in a channel matrix decomposition mode that decomposes channel matrices and determines matrix equalizer coefficients during a training period (e.g., HE-LTF field of a physical data unit). MIMO MEQ 212 also operates in a MIMO matrix equalization mode that applies equalization coefficients to data symbols received in a data portion of a received data unit. In at least one embodiment, MIMO MEQ 212 supports data units of different channel bandwidths and different numbers of subcarriers in the training fields and data portion of the received data unit. In at least one embodiment, MIMO MEQ 212 supports a plurality of modes corresponding to different combinations of M receiver antennas and $N_{SS}$ spatial streams. For example, MIMO MEQ 212 is configured to support some or all possible combinations of M receiver antennas and $N_{SS}$ spatial streams, where $M \geq N_{SS}$, $M \leq M_{MAX}$, and $N_{SS} \leq N_{SS\_MAX}$.

In at least one embodiment, MIMO MEQ 212 determines inverse channel matrices for each subcarrier of the OFDM signal using an implementation of a QR algorithm with permutations that perform iterations of QR decomposition (i.e., QR factorization or QU factorization) to find eigenvalues and eigenvectors simultaneously. QR decomposition decomposes channel matrix H into a product of an orthogonal matrix Q and an upper triangular matrix R. MIMO MEQ 212 iteratively decomposes channel matrix H by iteratively rotating complex elements of the channel matrix. In at least one embodiment, CORDIC engine 220 decomposes the channel matrix by iteratively multiplying the complex elements of channel matrix H by successions of constant values. For example, embodiments of MIMO MEQ 212 implement a Gram-Schmidt algorithm, Givens rotations algorithm, a Householder reflections algorithm, or other iterative algorithm to compute the QR decomposition of channel matrix H.

For example, where $M=N_{SS}=4$, channel matrix H is a 4×4 matrix and every element of Y, H, and $S_{TX}$ is a complex number:

$$\begin{bmatrix} y_1 \\ y_2 \\ y_3 \\ y_4 \end{bmatrix} = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \begin{bmatrix} x_1 \\ x_2 \\ x_3 \\ x_4 \end{bmatrix}.$$

The technique performs the QR decomposition of the channel matrix H to obtain an orthogonal matrix $Q_4$ and an upper triangular matrix $R_4$ that is a first permutation result:

$$\begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \rightarrow \begin{bmatrix} R_{11} & r_{12} & r_{13} & r_{14} \\ 0 & R_{22} & r_{23} & r_{24} \\ 0 & 0 & R_{33} & r_{34} \\ 0 & 0 & 0 & R_{44} \end{bmatrix} \rightarrow R_4.$$

Next, the technique swaps columns three and four of the first permutation result $R_4$ and performs the QR decomposition of that resulting matrix to obtain an orthogonal matrix $Q_3$ and an upper triangular matrix $R_3$ that is a second permutation result:

$$\begin{bmatrix} R_{11} & r_{12} & r_{14} & r_{13} \\ 0 & R_{22} & r_{24} & r_{23} \\ 0 & 0 & r_{34} & R_{33} \\ 0 & 0 & R_{44} & 0 \end{bmatrix} \rightarrow \begin{bmatrix} R_{11} & r_{12} & r_{13}^3 & r_{14}^3 \\ 0 & R_{22} & r_{23}^3 & r_{24}^3 \\ 0 & 0 & R_{33}^3 & r_{34}^3 \\ 0 & 0 & 0 & R_{44}^3 \end{bmatrix} \rightarrow R_3.$$

Next, the technique moves the second column to the last column and moves the original third and fourth columns to the left, and performs the QR decomposition of that resulting matrix to obtain an orthogonal matrix $Q_2$ and an upper triangular matrix $R_2$ that is a third permutation result:

$$\begin{bmatrix} R_{11} & r_{13} & r_{14} & r_{12} \\ 0 & r_{23} & r_{24} & R_{22} \\ 0 & R_{33} & r_{34} & 0 \\ 0 & 0 & R_{44} & 0 \end{bmatrix} \rightarrow \begin{bmatrix} R_{11} & r_{12}^2 & r_{13}^2 & r_{14}^2 \\ 0 & R_{22}^2 & r_{23}^2 & r_{24}^2 \\ 0 & 0 & R_{33}^2 & r_{34}^2 \\ 0 & 0 & 0 & R_{44}^2 \end{bmatrix} \rightarrow R_2.$$

Finally, the technique moves the first column to the last column and moves the original second, third, and fourth columns to the left, and then performs the QR decomposition of that permutation of H to obtain an orthogonal matrix $Q_1$ and an upper triangular matrix $R_1$ that is the fourth permutation result:

$$\begin{bmatrix} r_{12} & r_{13} & r_{14} & R_{11} \\ R_{22} & r_{23} & r_{24} & 0 \\ 0 & R_{33} & r_{34} & 0 \\ 0 & 0 & R_{44} & 0 \end{bmatrix} \rightarrow \begin{bmatrix} R_{11}^1 & r_{12}^1 & r_{13}^1 & r_{14}^1 \\ 0 & R_{22}^1 & r_{23}^1 & r_{24}^1 \\ 0 & 0 & R_{33}^1 & r_{34}^1 \\ 0 & 0 & 0 & R_{44}^1 \end{bmatrix} \rightarrow R_1.$$

In the exemplary 4×4 receiver, with Y and H available, MIMO MEQ 212 is designed to obtain $S_{TX}$. All of the Q matrix elements generated from the QR operation of all permutations are stored in memory 224. The last elements from each upper triangular matrix (i.e., $R_{44}^1$, $R_{44}^2$, $R_{44}^3$, and $R_{44}^4$ of $R_1$, $R_2$, $R_3$, and $R_4$, respectively) are stored in memory 224 for data symbol processing to solve for $x_1$, $x_2$, $x_3$, and $x_4$.

In general, $Q_j^k$ and $R_j^k$ represent results of a QR decomposition of transforming the channel matrix into an orthogonal matrix $Q_j^k$ and an upper triangular matrix $R_j^k$, where j denotes the $j^{th}$ permutation and k denotes the $k^{th}$ information stream. For example, to solve for the fourth information stream $x_4$, MIMO MEQ 212 applies the QR decomposition on the $1^{st}$ permutation of H to transform H into a product of an orthogonal matrix $Q_1^4$ and an upper triangular matrix $R_1^4$, hence $H = Q_1^4 * R_1^4$. For the first permutation, Q consists of rotation angles $\phi$ and $\theta$ generated from CORDIC operations. For an orthogonal matrix Q, its transpose matrix $Q^T$ must satisfy $Q^T * Q = I$. After we have $Q_1^4$, to solve for $x_4$, MIMO MEQ 212 multiples $(Q_1^4)^T$ with $Y_{RX}$ (e.g., using CORDIC engine 220 during the data symbol).

$$(Q_1^4)^T (Y_{RX}) = (Q_1^4)^T * H * (S_{TX}) \rightarrow$$

$$(Q_1^4)^T (Y_{RX}) = (Q_1^4)^T * (Q_1^4) * R_1^4 * (S_{TX}) \rightarrow$$

$$(Q_1^4)^T (Y_{RX}) = R_1^4 * (S_{TX});$$

$$H = Q_1^4 \times \begin{bmatrix} R_{11} & r_{12} & r_{13} & r_{14} \\ 0 & R_{22} & r_{23} & r_{24} \\ 0 & 0 & R_{33} & r_{34} \\ 0 & 0 & 0 & R_{44} \end{bmatrix};$$

$$(Q_1^4)^T (Y_{RX}) = \begin{bmatrix} y_1^4 \\ y_2^4 \\ y_3^4 \\ y_4^4 \end{bmatrix} = \begin{bmatrix} R_{11} & r_{12} & r_{13} & r_{14} \\ 0 & R_{22} & r_{23} & r_{24} \\ 0 & 0 & R_{33} & r_{34} \\ 0 & 0 & 0 & R_{44} \end{bmatrix} \times (S_{TX}); x_4 = \frac{y_4^4}{R_{44}}.$$

To solve for information stream $x_3$, after the first QR operation of H, the technique re-arranges the $R_4$ matrix (second permutation on $R_4$) and X vector to satisfy the equation:

$$\begin{bmatrix} y_1^4 \\ y_2^4 \\ y_4^4 \\ y_3^4 \end{bmatrix} = \begin{bmatrix} R_{11} & r_{12} & r_{14} & r_{13} \\ 0 & R_{22} & r_{24} & r_{23} \\ 0 & 0 & r_{34} & R_{33} \\ 0 & 0 & R_{44} & 0 \end{bmatrix} \begin{bmatrix} x_1 \\ x_2 \\ x_4 \\ x_3 \end{bmatrix}.$$

To solve for $x_3$, first perform the QR decomposition on $$\begin{bmatrix} R_{11} & r_{12} & r_{14} & r_{13} \\ 0 & R_{22} & r_{24} & r_{23} \\ 0 & 0 & r_{34} & R_{33} \\ 0 & 0 & R_{44} & 0 \end{bmatrix}$$

to make $$\begin{bmatrix} R_{11} & r_{12} & r_{14} & r_{13} \\ 0 & R_{22} & r_{24} & r_{23} \\ 0 & 0 & r_{34} & R_{33} \\ 0 & 0 & R_{44} & 0 \end{bmatrix} = (Q_2^3) \times R_2^3 = (Q_2^3) \begin{bmatrix} R_{11} & r_{12}^3 & r_{13}^3 & r_{14}^3 \\ 0 & R_{22}^3 & r_{23}^3 & r_{24}^3 \\ 0 & 0 & R_{33}^3 & r_{34}^3 \\ 0 & 0 & 0 & R_{44}^3 \end{bmatrix},$$

and then multiply $(Q_2^3)^T$ with $(Q_1^4)^T(Y_{RX})$ $$(Q_2^3)^T \begin{bmatrix} y_1^4 \\ y_2^4 \\ y_3^4 \\ y_4^4 \end{bmatrix} = (Q_2^3)^T \times$$

$$(Q_2^3) \begin{bmatrix} R_{11} & r_{12}^3 & r_{13}^3 & r_{14}^3 \\ 0 & R_{22}^3 & r_{23}^3 & r_{24}^3 \\ 0 & 0 & R_{33}^3 & r_{34}^3 \\ 0 & 0 & 0 & R_{44}^3 \end{bmatrix} \times \begin{bmatrix} x_1 \\ x_2 \\ x_4 \\ x_3 \end{bmatrix} \rightarrow \begin{bmatrix} y_1^3 \\ y_2^3 \\ y_3^3 \\ y_4^3 \end{bmatrix} = \begin{bmatrix} R_{11} & r_{12}^3 & r_{13}^3 & r_{14}^3 \\ 0 & R_{22}^3 & r_{23}^3 & r_{24}^3 \\ 0 & 0 & R_{33}^3 & r_{34}^3 \\ 0 & 0 & 0 & R_{44}^3 \end{bmatrix} \times$$

$$\begin{bmatrix} x_1 \\ x_2 \\ x_4 \\ x_3 \end{bmatrix} \rightarrow x_3 = \frac{y_4^3}{R_{44}^3}.$$

Similar to the QR operation on the second permutation, for the QR operation on the third permutation, the technique rearranges the $R_4$ matrix (third permutation on $R_4$) and X vector to satisfy the equation:

$$\begin{bmatrix} y_1^4 \\ y_2^4 \\ y_3^4 \\ y_4^4 \end{bmatrix} = \begin{bmatrix} R_{11} & r_{13} & r_{14} & r_{12} \\ 0 & r_{23} & r_{24} & R_{22} \\ 0 & R_{33} & r_{34} & 0 \\ 0 & 0 & R_{44} & 0 \end{bmatrix} \begin{bmatrix} x_1 \\ x_3 \\ x_4 \\ x_2 \end{bmatrix}.$$

To solve for $x_2$, the technique first performs the QR decomposition on $$\begin{bmatrix} R_{11} & r_{13} & r_{14} & r_{12} \\ 0 & r_{23} & r_{24} & R_{22} \\ 0 & R_{33} & r_{34} & 0 \\ 0 & 0 & R_{44} & 0 \end{bmatrix}$$

to obtain $$\begin{bmatrix} R_{11} & r_{13} & r_{14} & r_{12} \\ 0 & r_{23} & r_{24} & R_{22} \\ 0 & R_{33} & r_{34} & 0 \\ 0 & 0 & R_{44} & 0 \end{bmatrix} = (Q_3^2) \times R_3^2 = (Q_3^2) \begin{bmatrix} R_{11} & r_{12}^2 & r_{13}^2 & r_{14}^2 \\ 0 & R_{22}^2 & r_{23}^2 & r_{24}^2 \\ 0 & 0 & R_{33}^2 & r_{34}^2 \\ 0 & 0 & 0 & R_{44}^2 \end{bmatrix}$$

and then multiplies $(Q_3^2)^T$ with $(Q_1^4)^T(Y_{RX})$:

$$(Q_3^2)^T \begin{bmatrix} y_1^4 \\ y_2^4 \\ y_3^4 \\ y_4^4 \end{bmatrix} = (Q_3^2)^T *$$

$$(Q_3^2) \begin{bmatrix} R_{11} & r_{12}^2 & r_{13}^2 & r_{14}^2 \\ 0 & R_{22}^2 & r_{23}^2 & r_{24}^2 \\ 0 & 0 & R_{33}^2 & r_{34}^2 \\ 0 & 0 & 0 & R_{44}^2 \end{bmatrix} * \begin{bmatrix} x_1 \\ x_3 \\ x_4 \\ x_2 \end{bmatrix} \rightarrow \begin{bmatrix} y_1^2 \\ y_2^2 \\ y_3^2 \\ y_4^2 \end{bmatrix} = \begin{bmatrix} R_{11} & r_{12}^2 & r_{13}^2 & r_{14}^2 \\ 0 & R_{22}^2 & r_{23}^2 & r_{24}^2 \\ 0 & 0 & R_{33}^2 & r_{34}^2 \\ 0 & 0 & 0 & R_{44}^2 \end{bmatrix} *$$

$$\begin{bmatrix} x_1 \\ x_3 \\ x_4 \\ x_2 \end{bmatrix} \rightarrow x_2 = \frac{y_4^2}{R_{44}^2}.$$

Similar to the QR operation on the third permutation, for the QR operation on the fourth permutation, the technique rearranges the $R_4$ matrix (fourth permutation on $R_4$) and X vector to satisfy the equation:

$$\begin{bmatrix} y_1^4 \\ y_2^4 \\ y_3^4 \\ y_4^4 \end{bmatrix} = \begin{bmatrix} r_{12} & r_{13} & r_{14} & R_{11} \\ R_{22} & r_{23} & r_{24} & 0 \\ 0 & R_{33} & r_{34} & 0 \\ 0 & 0 & R_{44} & 0 \end{bmatrix} \begin{bmatrix} x_2 \\ x_3 \\ x_4 \\ x_1 \end{bmatrix}.$$

To solve for $x_1$, the technique first performs the QR decomposition on $$\begin{bmatrix} r_{12} & r_{13} & r_{14} & R_{11} \\ R_{22} & r_{23} & r_{24} & 0 \\ 0 & R_{33} & r_{34} & 0 \\ 0 & 0 & R_{44} & 0 \end{bmatrix},$$

to make $$\begin{bmatrix} r_{12} & r_{13} & r_{14} & R_{11} \\ R_{22} & r_{23} & r_{24} & 0 \\ 0 & R_{33} & r_{34} & 0 \\ 0 & 0 & R_{44} & 0 \end{bmatrix} = (Q_4^1) * R_4^1 = (Q_4^1) \begin{bmatrix} R_{11}^1 & r_{12}^1 & r_{13}^1 & r_{14}^1 \\ 0 & R_{22}^1 & r_{23}^1 & r_{24}^1 \\ 0 & 0 & R_{33}^1 & r_{34}^1 \\ 0 & 0 & 0 & R_{44}^1 \end{bmatrix},$$

and then multiply $(Q_1^4)^T$ with $(Q_1^4)^T(Y_{RX})$:

$$(Q_4^1)^T \begin{vmatrix} y_1^4 \\ y_2^4 \\ y_3^4 \\ y_4^4 \end{vmatrix} = (Q_4^1)^T \times$$

$$(Q_4^1) \times \begin{bmatrix} R_{11} & r_{12}^2 & r_{13}^2 & r_{14}^2 \\ 0 & R_{22}^2 & r_{23}^2 & r_{24}^2 \\ 0 & 0 & R_{33}^2 & r_{34}^2 \\ 0 & 0 & 0 & R_{44}^2 \end{bmatrix} \times \begin{bmatrix} x_2 \\ x_3 \\ x_4 \\ x_1 \end{bmatrix} \rightarrow \begin{bmatrix} y_1^1 \\ y_2^1 \\ y_3^1 \\ y_4^1 \end{bmatrix} = \begin{bmatrix} R_{11}^1 & r_{12}^1 & r_{13}^1 & r_{14}^1 \\ 0 & R_{22}^1 & r_{23}^1 & r_{24}^1 \\ 0 & 0 & R_{33}^1 & r_{34}^1 \\ 0 & 0 & 0 & R_{44}^1 \end{bmatrix} \times$$

$$\begin{bmatrix} x_2 \\ x_3 \\ x_4 \\ x_1 \end{bmatrix} \rightarrow x_1 = \frac{y_4^1}{R_{44}^1}.$$

Each of the permutations of the QR decomposition may be computed without multiplication by using a Coordinate Rotation DIgital Computer (CORDIC). A CORDIC applies Orthogonal Givens rotations using iterations of simple shift-add operations that are more hardware-efficient than other techniques for performing the QR decomposition (e.g., techniques that use conventional multiplication circuit). In general, a CORDIC implements known techniques to perform calculations, including trigonometric functions and complex multiplies, without using a multiplier. The only operations a CORDIC requires are addition, subtraction, bit-shift, and table-lookup operations. CORDIC techniques are used to perform the QR decomposition by multiplying a complex number by a succession of constant values that may be powers of two so that the rotation may be performed only using addition, subtraction, bit-shift, and/or table-lookup operations. A first iteration may rotate a vector (e.g., a vector having an x coordinate and a y coordinate on the unit circle), in one direction or other by a predetermined amount (e.g., 45 degrees or 90 degrees), followed by successive iterations in one direction or other of decreasing step size, until a target angle is achieved. Each iteration corresponds to a multiplication of a vector and a rotation matrix, which is performed using addition, subtraction, bit-shift, and/or table-lookup operations.

In at least one embodiment, MIMO MEQ 212 is configured to efficiently handle different supported bandwidths and modes corresponding to different combinations of receiver antennas and spatial streams. In at least one embodiment, MIMO MEQ 212 is configured to support a highest number of subcarriers corresponding to a largest supported bandwidth in combination with a maximum number of receiver antennas $M_{MAX}$ and a maximum number of spatial streams $N_{SS\_MAX}$. MIMO MEQ 212 is efficiently reconfigured when processing fewer subcarriers corresponding to smaller bandwidths or fewer receiver antennas (i.e., $M < M_{MAX}$) or fewer spatial streams (i.e., $N_{SS} < N_{SS\_MAX}$). Reconfiguration of MIMO MEQ 212 includes disabling or bypassing components of the MIMO MEQ 212 that are not needed for performing certain operations due to the reduction in the dimensions of a channel matrix in the different supported modes or reduction of the number of matrices corresponding to the different numbers of OFDM subcarriers.

In at least one embodiment, when operating in channel matrix decomposition mode, CORDIC engine 220 of MIMO MEQ 212 is configured to receive and decompose a plurality of channel matrices for a plurality of corresponding OFDM subcarriers. CORDIC engine 220 is configured to perform vector and rotation operations for decomposing each channel matrix. CORDIC engine 220 utilizes a pipelined architecture that reduces the number of CORDIC circuits by pipelining the processing of channel matrices corresponding to the spatial streams and the OFDM subcarriers. In at least one embodiment, multiple CORDIC cycles are used to process a plurality of channel matrices of a plurality of corresponding OFDM subcarriers, where a portion of CORDIC operations needed to fully decompose the channel matrices is performed in each of the CORDIC cycles. For example, to decompose 4×4 channel matrices corresponding to a plurality of OFDM subcarriers, CORDIC circuits in a first CORDIC cycle, are used to perform a first subset of operations on a first subset of spatial streams and a first subset of OFDM subcarriers, and then, in a second CORDIC cycle, reused to perform a second subset of operations on the first subset of spatial streams and the first subset of OFDM subcarriers or to perform the first subset of operations on a second subset of spatial streams and a second subset of OFDM subcarriers in a second CORDIC cycle, and so on.

The number of CORDIC circuits included in CORDIC engine 220 is determined based on a maximum number of OFDM subcarriers supported by MIMO MEQ 212, the maximum number of receiver antennas ($M_{MAX}$), a maximum number of spatial streams supported by MIMO MEQ 212 ($N_{SS\_MAX}$), and processing time in which MIMO MEQ 212 must complete processing of the channel matrices (e.g., for an 80 MHz packet bandwidth, 980 subcarriers of 4×4 channel matrices in less than 13.6 μs for IEEE standard 802.11ax or 234 subcarriers of 4×4 channel matrices in less than 4 μs for IEEE standard 802.11ac), which corresponds to a total duration of a training period (e.g., an HE-LTF field) of a received packet.

Figure 3:
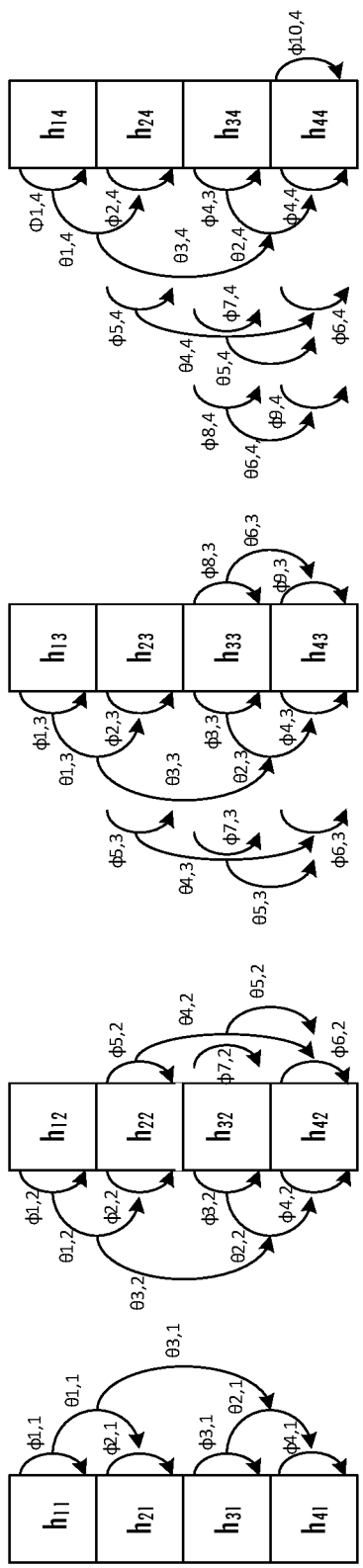
FIG. 3 illustrates exemplary CORDIC operations for a first permutation of a QR decomposition of a channel matrix consistent with at least one embodiment of the invention.

In at least one embodiment, CORDIC engine 220 receives a channel matrix for each subcarrier from channel estimator 218 and decomposes each channel matrix in a series of permutations. Each permutation corresponds to a respective one of the spatial streams. Conventional QR decomposition techniques are used to decompose a complex matrix H into a product of H=QR, where Q is an orthogonal matrix, and R is an upper-triangular matrix. To generate the Q matrix, a list of exemplary CORDIC operations for computing the QR decomposition of the first permutation of a 4×4 channel matrix for a single OFDM subcarrier is illustrated in FIG. 3. Column operations on the channel matrix include vector mode operations, which are illustrated on the right side of the column, and rotation mode operations, which are illustrated on the left side of the column. Symbol (I) indicates the output of an operation on the same row of the matrix and symbol θ indicates the output of an operation between different rows of the matrix. In vector mode, θ uses one CORDIC operation because it is an operation on two real numbers. In rotation mode, θ uses two CORDIC operation because it corresponds to an operation on two complex numbers.

Figure 7:
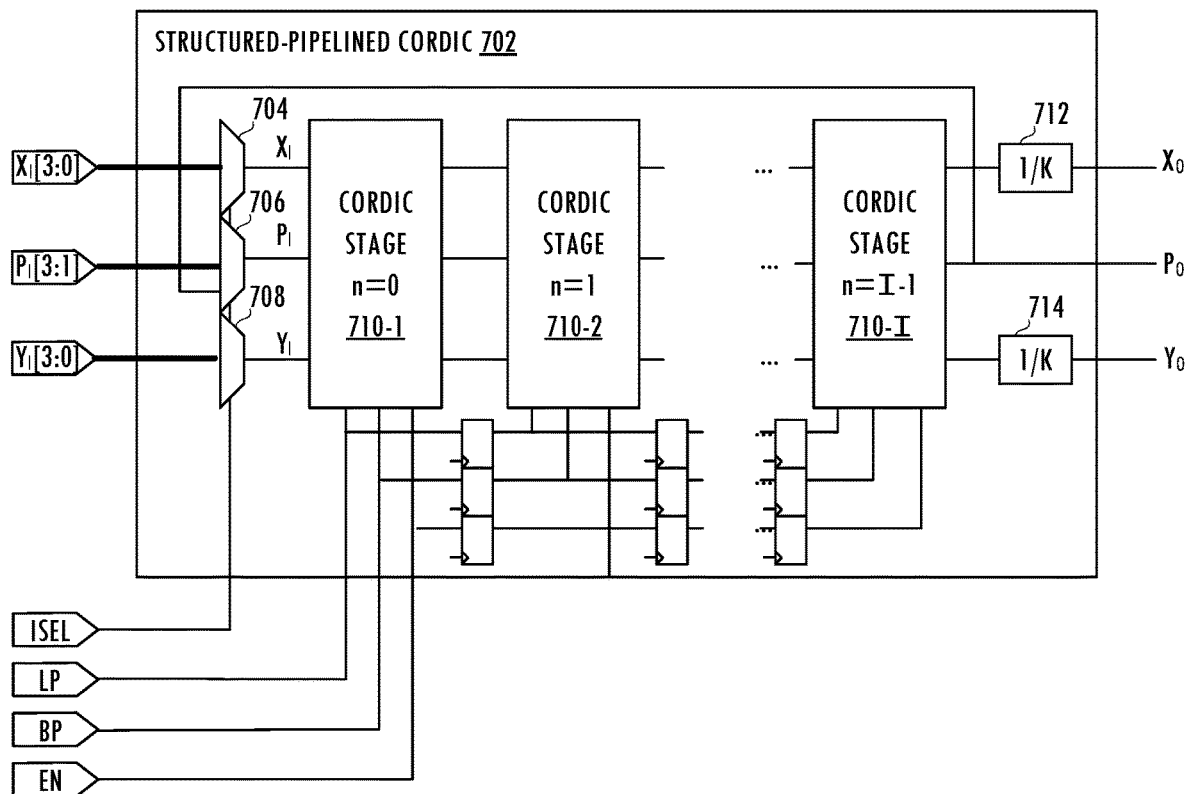
FIG. 7 illustrates a functional block diagram of a structured-pipelined CORDIC, consistent with at least one embodiment of the invention.

Referring to FIGS. 2, 3 and 7, CORDIC engine 220 processes the first column of the channel matrix corresponding to the first spatial stream by determining rotation angles φ that make complex elements $h_{11}$-$h_{41}$ in the first column become real numbers. In addition, CORDIC engine 220 determines rotation angles θ that make those real numbers corresponding to elements $h_{21}$-$h_{41}$ become zeros. Accordingly, in the first permutation, CORDIC engine 220 determines rotation angles that make the element $h_{11}$ become a real number and zero out elements $h_{21}$-$h_{41}$. In at least one embodiment, seven operations are performed on the first column. For the first operation, a structured-pipelined CORDIC (described further below) generates $\phi_{1,1}$ by performing a vector mode operation on input $h_{11}$. At the same time, other structured-pipelined CORDICs generate $\phi_{2,1}$, $\phi_{3,1}$, and $\phi_{4,1}$ by performing vector mode operations on inputs $h_{21}$, $h_{31}$, and $h_{41}$, respectively. Additional structured-pipelined CORDICs receive an output real number Xφ from $\phi_{1,1}$, $\phi_{2,1}$, $\phi_{3,1}$, and $\phi_{4,1}$, and perform vector mode operations on $X\phi_{1,1}$ and $X\phi_{2,1}$ to generate $\theta_{1,1}$, and perform vector mode operations on $X\phi_{3,1}$ and $X\phi_{4,1}$ to generate $\theta_{2,1}$. For example, to generate $\theta_{1,1}$, a structured-pipelined CORDIC performs a vector mode operation on an output real number $X_O$ of $\phi_{1,1}$ and an output real number $X_O$, of $\phi_{2,1}$. Similarly, to generate $\theta_{2,1}$, a structured-pipelined CORDIC performs a vector mode operation on an output real number $X_O$ of $\phi_{3,1}$ and an output real number $X_O$ of $\phi_{4,1}$. Another structured-pipelined CORDIC receives an output real number $X_O$ of $\theta_{1,1}$ and receives an output real number $X_O$ of $\theta_{2,1}$ and performs a vector mode operation on those values to generate $\theta_{3,1}$.

The QR decomposition on the second column of the channel matrix includes two steps. First, CORDIC engine 220 performs the $\phi_{1,2}$, $\phi_{2,2}$, $\phi_{3,2}$, $\phi_{4,2}$, $\theta_{1,2}$, $\theta_{2,2}$, and $\theta_{3,2}$ operations, which denotes the rotating the angles $\phi_1$, $\phi_2$, $\phi_3$, $\phi_4$, $\theta_1$, $\theta_2$, and $\theta_3$ derived from first column on the second column. In at least one embodiment, CORDIC engine 220 uses ten structured-pipelined CORDICs for rotating $\phi_{1,2}$, $\phi_{2,2}$, $\phi_{3,2}$, $\phi_{4,2}$, $\theta_{1,2}$, $\theta_{2,2}$, and $\theta_{3,2}$. Seven of the ten structured-pipelined CORDICs are reused from the first column operation. The switch from vector mode to rotation mode using the same structured-pipelined CORDICs requires feeding back output rotation angle $P_O$ of the structured-pipelined CORDICs to a corresponding input rotation angle $P_I$ of those structured-pipelined CORDICs. For example, for the $\phi_{1,2}$ operation, the structured-pipelined CORDIC used to generate $\phi_1$ from the first column is configured perform a rotation. That structured-pipelined CORDIC performs a rotation mode operation on output rotation angle $P_O$ of the $\phi_{1,1}$ operation of the first column as input rotation angle $P_I$, the real value of $h_{12}$ as input real number $X_I$, and the imaginary value of $h_{12}$ as input imaginary number $Y_I$. Similarly, for operations $\phi_{2,2}$, $\phi_{3,2}$, $\phi_{4,2}$, for the second column, structured-pipelined CORDICs used to generate $\phi_{2,1}$, $\phi_{3,1}$, $\phi_{4,1}$ for the first column are reconfigured in rotation mode and receive respective output rotation angles $P_O$ Of $\phi_{2,1}$, $\phi_{3,1}$, and $\phi_{4,1}$, of the first column as input rotation angles $P_I$, the real values of $h_{22}$, $h_{32}$ $h_{42}$, respectively, as input real numbers $X_I$, and the imaginary values of $h_{22}$, $h_{32}$ $h_{42}$, respectively, as input imaginary numbers $Y_I$. Structured-pipelined CORDICs perform rotation mode operations $\theta_{1,2}$, and $\theta_{2,2}$ from $\phi_{1,2}$ and $\phi_{2,2}$, and from $\phi_{3,2}$ and $\phi_{4,2}$, respectively. Another two structured-pipelined CORDICs perform a rotation mode operation $\theta_{3,2}$ from $\theta_{1,2}$ and $\theta_{2,2}$. The structured-pipelined CORDIC used to generate $\theta_{1,1}$, and $\theta_{2,1}$ is reused to perform the rotation operation $\theta_{1,2}$, and $\theta_{2,2}$. After the rotation operation on the angles derived from the first column, vector mode operations $\phi_{5,2}$, $\phi_{6,2}$, $\phi_{7,2}$, are performed to make the values of $h_{22}$, $h_{32}$ $h_{42}$, respectively, real values. Then, a vector mode operation generates $\theta_{4,2}$, using $X_O$ outputs from $\phi_{5,2}$ and $\phi_{6,2}$ and then, another vector mode operation generates $\theta_{5,2}$, using $X_O$ outputs from $\theta_{4,2}$ and $\phi_{6,2}$.

Similarly to the second column processing, the QR decomposition on the third column of the channel matrix includes two steps. First, CORDIC engine 220 processes rotation operations of $\phi_{1,3}$, $\phi_{2,3}$, $\phi_{3,3}$, $\phi_{4,3}$, $\theta_{1,3}$, $\theta_{2,3}$, $\theta_{3,3}$, $\phi_{5,3}$, $\phi_{6,3}$, $\phi_{7,3}$, $\theta_{4,3}$, $\theta_{5,3}$, on the third column. Then, CORDIC engine 220 performs vector operations $\phi_{8,3}$ and $\phi_{0,3}$ to make complex elements $h_{33}$ and $h_{43}$ become real numbers, an performs the vector operations $\theta_{6,3}$ to zero out element $h_{43}$. Similarly to the second and third column processing, CORDIC engine 220 processes the fourth column of the channel matrix by performing the rotation operations of $\phi_{1,3}$, $\phi_{2,3}$, $\phi_{3,3}$, $\phi_{4,3}$, for the third spatial stream to generate $\phi_{1,4}$, $\phi_{2,4}$, $\phi_{3,4}$, $\phi_{4,4}$, $\theta_{1,4}$, $\theta_{2,4}$, $\theta_{3,4}$, $\phi_{5,4}$, $\phi_{6,4}$, $\phi_{7,4}$, $\theta_{4,4}$, $\theta_{5,4}$, $\phi_{8,4}$, $\phi_{19,4}$, and $\theta_{6,4}$, and then performs vector operation of $\phi_{10,4}$ that makes complex elements $h_{44}$ become a real number.

In at least one embodiment, CORDIC engine 220 uses a total of 64 CORDIC operations for the first permutation of FIG. 3, which transforms the channel matrix into upper triangular matrix R. For example, seven CORDIC operations are performed for the first column, fifteen CORDIC operations are performed for the second column (performing ten operations derived from the first column and five additional vector operations), twenty CORDIC operations are performed for the third column (performing ten operations derived from the first column, repeating five operations derived from the second column, and three additional vector operations), and twenty-two CORDIC operations are performed for the fourth column (performing ten operations derived from the first column, seven operations derived from the second column, four operations derived from the third column, and one additional vector operation).

In at least one embodiment, a total of 16 structured-pipelined CORDICs are configured to perform those 64 CORDIC operations for the first permutation. Four structured-pipelined CORDICs are dedicated to performing the $\phi_{1,C}$, $\phi_{2,C}$, $\phi_{3,C}$, $\phi_{4,C}$, for all four columns C of the channel matrix (vector mode for column one and rotation mode for columns 2-4). For example, a structured-pipelined CORDIC is dedicated to the $\phi_{1,0}$ operation receives real and imaginary values of $h_{11}$ as the input for vector mode operation $\phi_{1,1}$. After performing the vector mode operation to generate $\phi_{1,1}$, that structured-pipelined CORDIC performs a rotation mode operation to generate $\phi_{1,2}$ using the real and imaginary values of $h_{12}$ and output rotation angle $P_O$ of $\phi_{1,1}$ as input rotation angle $P_I$. After performing vector mode operation $\phi_{1,2}$, that structured-pipelined CORDIC performs a rotation mode operation to generate $\phi_{1,3}$ using the real and imaginary values of $h_{13}$ and the output rotation angle $P_O$ of $\phi_{1,2}$ as input rotation angle $P_I$. After performing a vector mode operation to generate $\phi_{1,3}$, that structured-pipelined CORDIC performs a rotation mode operation to generate $\phi_{1,4}$ using the real and imaginary values of $h_{14}$ and output rotation angle $P_O$ of $\phi_{1,3}$ as input rotation angle $P_I$. Similarly, separate structured-pipelined CORDICs is dedicated to generating each of $\phi_{2,C}$, $\phi_{3,C}$ and $\phi_{4,C}$ and used by all four columns.

In at least one embodiment, another four structured-pipelined CORDICs are configured to perform $\theta_{1,C}$ and $\theta_{2,C}$ and used by all four columns (vector mode for the first column and rotation mode for the remaining columns). For example, one structured-pipelined CORDIC performs a vector mode operation on the $X_O$ output of $\phi_{1,1}$ as the $X_I$ input and the $X_O$ output of $\phi_{2,1}$ as the $Y_I$ input. After performing the vector mode operation to generate $\theta_{1,1}$, that structured-pipelined CORDIC and an additional structured-pipelined CORDIC perform rotation mode operations to generate $\theta_{1,C}$ for the remaining three columns. The first structured-pipelined CORDIC performs a rotation mode operation to generate $\theta_{1,2}$ using the $X_O$ output of $\phi_{1,2}$ as the $X_I$ input and using the $X_O$ output of $\phi_{2,2}$ as the $Y_I$ input. The second structured-pipelined CORDIC performs a rotation mode operation to generate $\theta_{1,2}$ using the $Y_O$ output of $\phi_{1,2}$ as the $X_I$ input and using the $Y_O$ output of $\phi_{2,2}$ as the $Y_I$ input. Next, the first structured-pipelined CORDIC performs a rotation mode operation $\theta_{1,3}$ using the $X_O$ output of $\phi_{1,3}$ as the $X_I$ input and using the $X_O$ output of $\phi_{2,3}$ as the $Y_I$ input. The second structured-pipelined CORDIC performs a rotation mode operation to generate $\theta_{1,3}$ using the $Y_O$ output of $\phi_{1,3}$ as the $X_I$ input using the $Y_O$ output of $\phi_{2,3}$ as the $Y_I$ input. Finally, the first structured-pipelined CORDIC performs a rotation mode operation $\theta_{1,4}$ on the $X_O$ output of $\phi_{1,4}$ on the $X_I$ input and the $X_O$ output of $\phi_{2,4}$ on the $Y_I$ input. The second structured-pipelined CORDIC performs a rotation mode operation to generate $\theta_{1,4}$ using the $Y_O$ output of $\phi_{1,4}$ as the $X_I$ input and using the $Y_O$ output of $\phi_{2,4}$ as the $Y_I$ input. Similarly, third and fourth structured-pipelined CORDICs perform $\theta_{2,C}$ vector and rotation operations on corresponding inputs.

Eight additional structured-pipelined CORDICs are configured to perform the remaining operations of the first permutation (illustrated in Tables 11A-D discussed further below). In at least one embodiment, CORDIC engine 220 stores rotation angles and resulting upper triangular matrices (or relevant elements thereof) in memory. Referring to FIGS. 2, 3, and 7, in at least one embodiment, CORDIC engine 220 reuses four structured-pipelined CORDICs to perform operations $\phi_{1,C}$ $\phi_{2,C}$, $\phi_{3,C}$, $\phi_{4,C}$, of the QR decomposition for all columns C of a channel matrix. The input multiplexers of the structured-pipelined CORDIC make this possible by selecting appropriate inputs $X_I$, $P_I$, and $Y_I$, and feeding back output $P_O$ to select circuit 706, thereby providing seamless switching of the structured pipelined CORDIC between vector mode operation and rotation mode operation.

Figure 4:
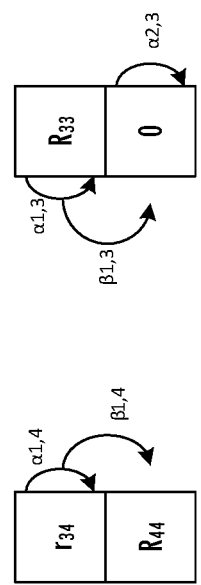
FIG. 4 illustrates exemplary CORDIC operations for a second permutation of the QR decomposition of the channel matrix consistent with at least one embodiment of the invention.

In at least one embodiment, CORDIC engine 220 further processes the upper triangular matrix R generated by the first permutation of the QR decomposition to perform the second permutation, third permutation, and fourth permutation, as described above, using exemplary operations illustrated in FIGS. 4-6 and represented in exemplary tables of FIGS. 11A-D. The second through fourth permutations perform operations on elements of the upper triangular matrix R generated by the first permutation and symbol α indicates an operation on the same row of matrix R and symbol β indicates an operation between different rows of matrix R. The second permutation requires six CORDIC operations, the third permutation uses fourteen CORDIC operations, and the fourth permutation requires twenty-five CORDIC operations. As a result, QR decomposition of an M×N channel matrix uses 109 CORDIC computations for each subcarrier. For an exemplary implementation compliant with IEEE standard 802.11ax, 980 subcarriers are used and each subcarrier requires the 109 CORDIC computations to complete within 13.6 μs. For an exemplary implementation compliant with IEEE standard 802.11ac, 234 subcarriers are used and each subcarrier requires the 109 CORDIC computations to complete within 4 μs. Therefore, processing delay is a substantial consideration for CORDIC design. In addition, in some embodiments, MIMO MEQ 212 supports computation of the inverse channel matrices for all subsets M×$N_{SS}$ of $M_{MAX}$×$N_{SS\_MAX}$, where M≥N. For example, where $M_{MAX}$=$N_{SS\_MAX}$=4, the MIMO MEQ supports channel matrix sizes of 1×1, 2×1, 3×1, 4×1, 2×2, 3×2, 4×2, 3×3, 4×3, and 4×4. In addition, embodiments of MIMO MEQ 212 support Space-Time Block Coding (STBC) modes with multiple (e.g., 2) spatial timing streams. In at least one embodiment, MIMO MEQ 212 supports combined bandwidth channel modes (e.g., 80P80), which may be used with STBC. Space-Time Block Coding (STBC) is another spatial stream multiplexing scheme that repeats transmitting the spatial streams into adjacent OFDM symbols. In at least one embodiment, to support STBC with four receiver antennas, after the transformation of a matrix, MIMO MEQ 212 processes two 4×2 matrices, which increases the utilization of hardware in the MIMO MEQ 212. In an embodiment using non-contiguous 160 MHz channel bandwidth (e.g., 80P80, i.e., a lower 80 MHZ band plus an upper 80 MHz band), different transceivers are allocated to separate bands. e.g. for a 4×4 transceivers implementing non-contiguous 160 MHz bandwidth operation, two of the transceivers are configured for the lower 80 MHz channel, and the other two transceivers are configured for the upper 80 MHz channel. Accordingly, MIMO MEQ 212 is configured to process two 2×2 matrices.

Each CORDIC operation is an iterative operation and, as illustrated in FIGS. 3-7, typical operations are dependent on at least one output of a prior CORDIC operation. Referring to FIGS. 2 and 7-9, in an exemplary embodiment, CORDIC engine 220 obtains target performance by performing CORDIC operations using structured-pipelined CORDICs. An exemplary structured-pipelined CORDIC performs at least ten iterations (e.g., I=11) for each CORDIC operation. The structured-pipelined CORDIC clock cycle (SPC cycle) equals the number of I+1 clock cycles, where the additional clock cycles is used for the 1/K scaling computation.

In at least one embodiment, in each SPC cycle, each structured-pipelined CORDIC is individually controlled to operate in a particular mode, e.g., a vector mode, a rotation mode, a bypass mode or an idle mode. The vector mode operation determines an output rotation angle $P_O$ based on input signals $X_I$ and $Y_I$. The rotation mode operation applies a previously determined rotation angle as input rotation angle $P_I$ to input signals $X_I$ and $Y_I$. A bypass mode propagates input signals $X_I$, $P_I$, and $Y_I$, to output signals $X_O$, $P_O$, and $Y_O$, without altering the input signals. The idle mode saves power when a structured-pipelined CORDIC is not used in a particular SPC cycle. For example, controller 222 controls each structured-pipelined CORDIC in CORDIC engine 220 per SPC cycle regardless of whether that structured-pipelined CORDIC is needed. In at least one embodiment, controller 222 generates a control table for controlling the mode of each structured-pipelined CORDIC in each SPC cycle. In at least one embodiment, control table information is set to a 3-bit or 5-bit word format of [EN, LP, BP, ISEL]. For example, bit EN is one bit wide with '1' enabling the corresponding structured-pipelined CORDIC. Bit LP is one bit wide, with '1' configuring the structured-pipelined CORDIC to load phase. Bit BP is one bit wide, with '1' configuring the structured-pipelined CORDIC is in bypass mode. The ISEL field can be zero bits (i.e., no generation is needed) to two bits wide. If ISEL has zero bits, there is only one input signal path to a structured-pipelined CORDIC. If ISEL is one bit wide, then two-to-one select circuits select between two input signal paths to the structured-pipelined CORDIC. If ISEL is two bits wide, then four-to-one select circuits select between four input signal paths to the structured-pipelined CORDIC. The bit width of ISEL depends on the number of input selected from by a structured-pipelined CORDIC, e.g., seven of sixteen structured-pipelined CORDICs for configured to compute a first permutation use an ISEL of 0 bits wide (i.e., ISEL is not needed), nine of sixteen structured-pipelined CORDICs use one bit ISEL, and structured-pipelined CORDICs configured for the second, third, and fourth permutations, all structured-pipelined CORDICs are configured with a two-bit wide ISEL, for better hardware reuse.

CORDIC design techniques that simplify the dataflow and control of a CORDIC, reuse hardware to reduce circuit area, and provide power consumption control in supported modes of operation are disclosed. Referring to FIG. 7, in at least one embodiment, structured-pipelined CORDIC 702 is a pipelined CORDIC with a structure that supports the various design targets of MIMO matrix equalization QR decomposition processing. Structured-pipelined CORDIC 702 includes select circuits at the inputs of structured-pipelined CORDIC 702 and a scaling circuit at the real and imaginary outputs but does not include iteration control logic or multiplexers coupled to shifter outputs between CORDIC stages that are used in conventional CORDIC implementations of MIMO MEQ QR processors (e.g., folded CORDIC implementations). Thus, structured-pipelined CORDIC 702 consumes less area and has circuit timing advantages as compared to conventional CORDIC implementations. Structured-pipelined CORDIC 702 is controlled using a parameterized input selection signal (ISEL) that selects one input $X_I$, input $P_I$, and input $Y_I$ using select circuit 704, select circuit 706, and select circuit 708, respectively. That is, input selection signal ISEL is associated with a parameter used during design time to reduce synthesized logic according to a particular instantiation of a structured-pipelined CORDIC. Therefore, the width of ISEL and the associated select circuits 704, 706, and 708 may vary to provide one output based on a parameterized number of input signals. For example, a parameter of '0' corresponds to one input (i.e., no selection needed), '2' selects 2-to-1, '4' correspond to selection of 4-to-1. The ISEL signal also selects output rotation angle $P_O$ from three other rotation angle signals as an input rotation angle $P_I$ to seamlessly select between vector mode operation and rotation mode operation of structured-pipelined CORDIC 702. Control signal LP selects between a load phase operation for rotation mode and no-load phase operation of a CORDIC stage 710-n for vector mode.

In at least one embodiment, when set, bypass control signal BP configures a CORDIC stage 710 as part of a delay pipe. Control signal EN disables CORDIC stage 710 for power savings and storage operations. The internal delay pipe on control signal EN achieves clock gating to the exact clock cycle for the CORDIC stage to be enabled or disabled. In at least one embodiment of structured-pipelined CORDIC 702, each CORDIC stage 710 is implemented, consistent with FIG. 8. CORDIC stage 710 performs a microrotation by performing shifts and adds of conditionally complemented values without using multiplications. In an exemplary QR decomposition, CORDIC stage 710 is configured to apply orthogonal Givens rotations to zero out the sub-diagonal elements of the matrix. Scalers 712 and 714 apply scaling factor K, which is a predetermined constant, to outputs $X_O$ and $Y_O$, independently from an angle of rotation and is based on the number of iterations I.

Figure 8:
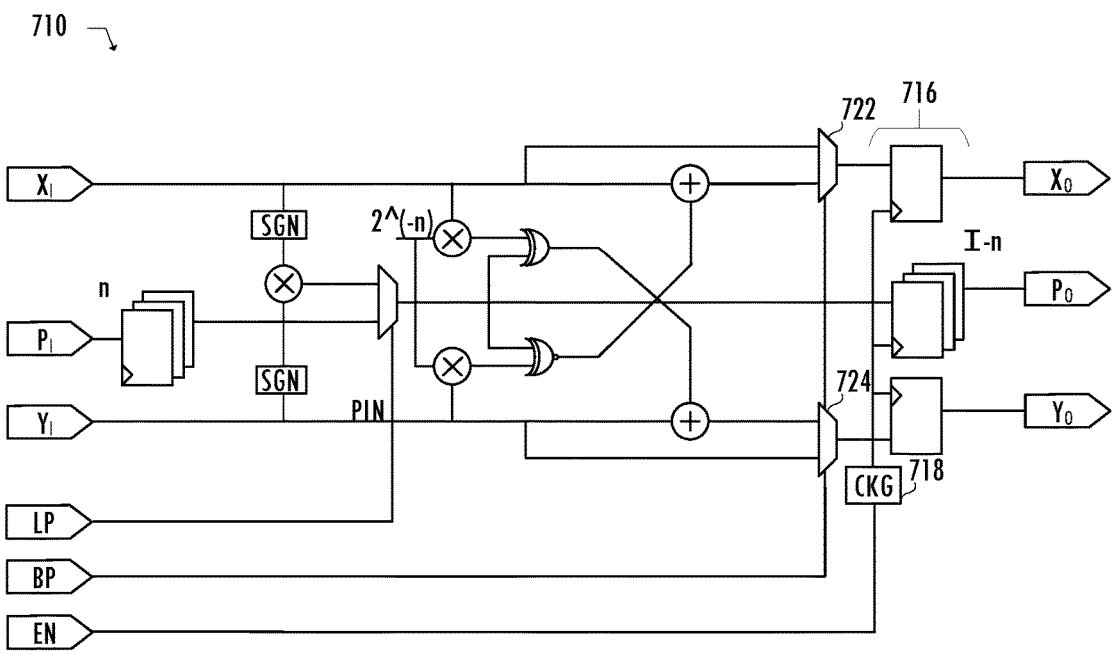
FIG. 8 illustrates a functional block diagram of a CORDIC stage of the structured-pipelined CORDIC of FIG. 7, consistent with at least one embodiment of the invention.

Referring to FIGS. 7 and 8, when operating in a vector mode, structured-pipelined CORDIC 702 receives digital values $X_I[3:0]$ and $Y_I[3:0]$. Select circuits 704 and select circuit 708 provide selected values of $X_I$ and $Y_I$, respectively, to first CORDIC stage 710-1. CORDIC stages 710 iteratively rotate input vector $(X_I, Y_I)$ until output $Y_O=0$ and accumulate the rotation angle in output rotation angle $P_O$. The output of CORDIC stage 710-n (i.e., stage i), serves as the input for the next adjacent CORDIC stage 710-n (i.e., stage i+1). For example, if the initial vector is in the first quadrant, a CORDIC stage 710-n rotates input vector $(X_I, Y_I)$ by $+\sigma_i$ if $Y[i]<0$ and rotates by $-\sigma_i$ if $Y[i]\geq 0$. After I iterations, $X_O=K\times(X_I^2+Y_I^2)^{1/2}$, $Y_O=0$ and the rotation angle accumulated in output rotation angle $$P_O = \tan^{-1}\left(\frac{Y_I}{X_I}\right),$$

where K is a constant scaling factor (e.g., K=1.646760258). In at least one embodiment, of structured-pipelined CORDIC 702, after I iterations, output rotation angle $P_O$ a series of binary bits indicating the direction of rotation for each of the i iterations. For example, a logic value of '0' indicates counterclockwise rotation for the iteration corresponding to the bit location in output rotation angle $P_O$ and a logic value of '1' indicates a clockwise rotation for the iteration corresponding to the bit location in $P_O$. After I iterations, structured-pipelined CORDIC 702 provides output rotation angle $P_O$ to a next structured-pipelined CORDIC 702 for use as an input rotation angle or output rotation angle $P_O$ is stored in memory.

In at least one embodiment, CORDIC stage 710 includes n state elements coupled to input rotation angle $P_I$ and I-n state elements coupled to output rotation angle $P_O$ to support pipelined implementation. For a rotation operation, of input rotation angle $P_I[10:0]$, assuming that input rotation angle $P_I[10:0]$ is available at the input of structured-pipelined CORDIC 702, for the first CORDIC stage 710-1, $P_I[0]$ is needed and loaded without delay. For the CORDIC stage 710-2, input rotation angle $P_I[1]$ is delayed one cycle to be loaded, and input rotation angle $P_O[10]$ needs to be delayed 10 cycles to be used by the tenth stage, CORDIC stage 710-n. For a vector operation, assuming that output rotation angle $P_O[n]$ is generated by the $n^{th}$ CORDIC stage, output rotation angle $P_O[0]$ is output rotation angle $P_O[0]$ delayed by ten cycles, output rotation angle $P_O[1]$ is output rotation angle $P_O[1]$ delayed by nine cycles, and so on. In this manner, all bits of output rotation angle $P_O[10:0]$ are aligned for later use.

In at least one embodiment, when operating in a rotation mode, structured-pipelined CORDIC 702 applies a previously determined rotation angle (e.g., the rotation angle determined in the vector mode operation) to the input signals. For example, rotating initial vector $(X_I, Y_I)$ by input rotation angle $P_I$ includes decomposing the angle $$P[i+1] = P[i] - \sigma_i \tan^{-1}(2^{-i}), \text{ where } \sigma_i(x) = \begin{cases} 1, & P[i] < 0 \\ -1, & P[i] \geq 0 \end{cases};$$

and after I iterations, $X_O=K\times(X_I \cos P - Y_I \cos P)$; and $X_O=K\times(X_I \sin P+Y_I \cos P)$ and $P_O=0$. In at least one embodiment, I predetermined values of $\tan^{-1}(2^{-i})$ are stored in storage elements and are accessed by index i. After I iterations, structured-pipelined CORDIC 702 provides outputs $X_O$ and $Y_O$ to a next structured-pipelined CORDIC for use as inputs $X_I$ and $Y_I$ or are stored in memory.

In at least one embodiment, when operating in a bypass mode, structured-pipelined CORDIC 702 receives input signals $X_I$ and $Y_I$ and shifts those received values through the CORDIC stages 710-1 through 7104-1 without performing any operations on those values by the logic circuits. In each CORDIC stage 710, select circuits 722 and 724 pass input signals $X_I$ and $Y_I$ to the storage elements, which present those signals as the output signals $X_O$ and $Y_O$. The I-1$^{th}$ CORDIC stage of structured-pipelined CORDIC 702 provides output signals $X_O$ and $Y_O$ to a next structured-pipelined CORDIC 702 for use as input signals $X_I$ and $Y_I$, or are stored in memory. In the bypass mode, structured-pipelined CORDIC 702 introduces a delay to input signals $X_{in}$ and $Y_{in}$ without altering input signals $X_I$ and $Y_I$. The bypass mode is used when CORDIC engine 220 is operating in a mode with less than a maximum supported number of receiver antennas (i.e., $M<M_{MAX}$), in order to keep the pipeline delay the same as the pipeline delay in the case with the maximum supported number of receiver antennas (i.e., $M=M_{MAX}$). In bypass mode, structured-pipelined CORDIC 702 is configured as a delay register for operations that need not be performed due to a reduction in the number of receiver antennas (i.e., $M<M_{MAX}$). For example, in an embodiment which the maximum number of receiver antennas supported by the CORDIC engine 220 is 4 (i.e., $M_{MAX}=4$), an exemplary structured-pipelined CORDIC 702 is configured as a delay register when CORDIC engine 220 is processing a 3×2 channel matrix (i.e., $M=3$ and $N_{SS}=2$) for operations associated with determining rotation angles in connection with zeroing out elements. Bypass mode of structured-pipelined CORDIC 702 eliminates additional registers or memory storage as well as additional accesses to memory storage for temporarily storing input signals $X_I$ and $Y_I$ when particular operations on input signals $X_I$ and $Y_I$ need not be performed due to reduction in the number of receiver antennas, thereby reducing overall power consumption of the MIMO MEQ 212.

In at least one embodiment, when operating in a disabled mode, structured-pipelined CORDIC 702 is disabled and enters an idle state to save power. For example, a clock gating circuit 718 of CORDIC stage 710 prunes the clock signal to storage elements in CORDIC stage 710 (e.g., storage elements 716) that are coupled to the output terminals $X_O$, $P_O$, and $Y_O$, thereby reducing or eliminating power consumption of structured-pipelined CORDIC 702. In at least one embodiment, the disabled mode is used to disable structured-pipelined CORDIC 702 in non-active CORDIC cycle operation of the MIMO MEQ 212, e.g., before or after channel matrices or data symbols pass through CORDIC engine 220 or pass through a structured-pipelined CORDIC 702 of the CORDIC engine 220. In at least one embodiment, the disabled mode is used when CORDIC engine 220 is configured in a mode with less than the maximum supported number of receiver antennas (i.e., $M<M_{MAX}$) or less than the maximum number of supported spatial streams (i.e., $N_{SS}<N_{SS\_MAX}$). For example, in an embodiment which the maximum number of receiver antennas supported by the CORDIC engine 220 is 4 (i.e., $M_{MAX}=4$), structured-pipelined CORDIC 702 is disabled for a particular SPC cycle if CORDIC engine 220 is processing a 3×2 channel matrix and the particular structured-pipelined CORDIC 702 would be used for operations associated with determining a rotation angle in connection with elements $H_4$ of the channel matrix.

Figure 9:
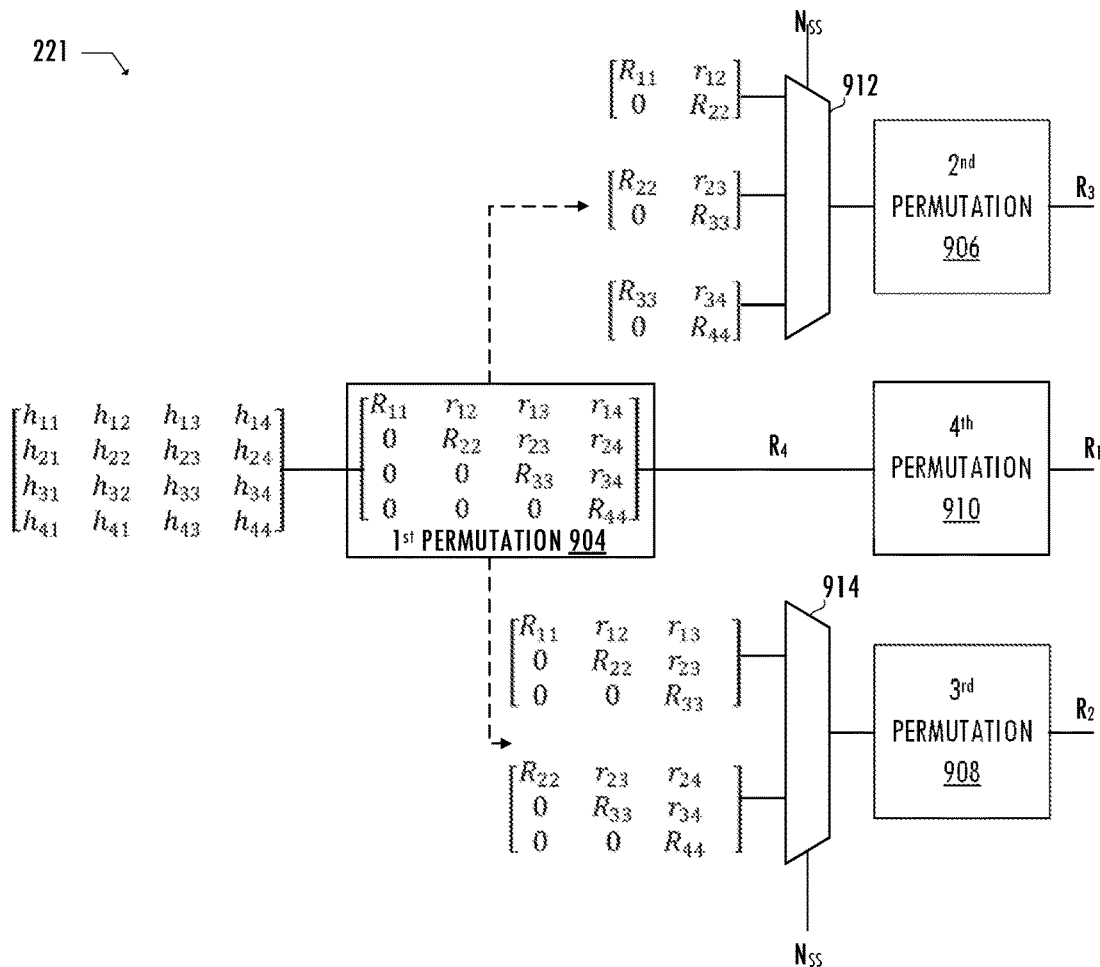
FIG. 9 illustrates a functional block diagram of an exemplary configuration of structured-pipelined CORDICs in a CORDIC engine of a matrix equalizer consistent with at least one embodiment of the invention.

Referring to FIG. 9, in at least one embodiment of MIMO MEQ 212, structured-pipelined CORDICs of CORDIC sub-engine 221 are organized according to permutation operations. First permutations structured-pipelined CORDICs 904 includes $M_{MAX} \times N_{SS\_MAX}$ structured-pipelined CORDICs. (e.g., 16 structured-pipelined CORDICs where $M_{MAX}=N_{SS\_MAX}=4$). The resulting upper triangular matrix $R_4$ is used to provide inputs to second permutation structured-pipelined CORDICs 906, third permutation structured-pipelined CORDICs 908, and fourth permutation structured-pipelined CORDICs 910, which generate upper triangular matrices $R_3$, $R_2$, and $R_1$, respectively. In an exemplary embodiment, second permutation structured-pipelined CORDICs 906 includes two structured-pipelines CORDICs, third permutation structured-pipelined CORDICs 908 includes four structured-pipelines CORDICs, and fourth permutation structured-pipelined CORDICs 910 includes six structured-pipelines CORDICs, for a total of twelve structured-pipelines CORDICs (i.e., $M_{MAX} \times N_{SS\_MAX}-1$) for the second, third, and fourth permutations. In at least one embodiment, select circuit 912 is a 3:1 multiplexer that selects elements or submatrices of upper triangular matrix $R_4$ as inputs for the second permutation and select circuit 914 is a 2:1 multiplexer that selects elements or submatrices of upper triangular matrix $R_4$ as inputs to the third permutation. Select circuits 912 and 914 are sized based on $N_{SS\_MAX}$ and their enable signals are based on $N_{SS}$ for an operating configuration. For example, a 3:1 multiplexer is added for the $2^{nd}$ permutation structured-pipelined CORDICs 906 input selection to select between inputs for $N_{SS}=4$, $N_{SS}=3$, or $N_{SS}=2$ and a 2:1 multiplexer is added for the $3^{rd}$ permutation structured-pipelined CORDICs 908 input selection to select between inputs for $N_{SS}=4$ or $N_{SS}=3$. In each SPC cycle, CORDIC sub-engine 221 receives and processes subsets of channel matrix elements corresponding to a subset of OFDM subcarriers. Channel matrix elements for different OFDM subcarriers progress through CORDIC sub-engine 221 in different SPC cycles.

Referring to FIGS. 2 and 11A-D, in at least one embodiment, CORDIC engine 220 includes M×N structured-pipelines CORDICs for each subcarrier supported by receiver 200. Where $M=N=4$, sixteen structured-pipelined CORDICs perform 64 CORDIC operations with a reuse rate of four. That is, every four SPC cycles, structured-pipelined CORDIC repeats its operation and achieves full utilization of hardware during steady-state operation. For every four SPC cycles, CORDIC engine 220 processes I+1 subcarriers, e.g., for an 11-iteration structured-pipelined CORDIC, twelve subcarriers are processed in four SPC cycles. Each SPC cycle includes twelve clock cycles (eleven iterations plus one SPC cycle for scaling by 1/K). In at least one embodiment, the structured-pipelined CORDIC is reused up to four times for up to four columns of the QR computation. A structured-pipelined CORDIC having a reuse ratio of four processes 4×4 matrices for twelve subcarriers in every four SPC cycles (48 clock cycles total). CORDIC engine 220 receives channel matrices corresponding to subsets of OFDM subcarriers over multiple burst cycles. Channel matrices corresponding to different subsets of OFDM subcarriers are received in different burst cycles. For example, CORDIC engine 220 receives new channel matrices of a subset of OFDM subcarriers every four SPC cycles.

In at least one embodiment, CORDIC engine 220 includes 16 (i.e., $M_{MAX} \times N_{SS\_MAX}$) structured-pipelined CORDICS to perform the first permutation of QR decomposition for a 4×4 channel matrix. Sixteen structured-pipelined CORDICS perform 64 CORDIC operations with a reuse rate of four. For every four SPC cycles, I-iteration+1 subcarriers are processed. Thus, in every four SPC cycles, a structured-pipelined CORDIC repeats its operation and achieves 100% utilization. In FIGS. 11A and 11B, the bolded entries are associated with a first subcarrier and other entries are associated with other subcarriers, $\phi$ refers to self-angle, and $\theta$ refers to cross angle between two different rows, $\phi$n,m refers to vector operation to generate $\phi$n if underlined, or rotation operation of an angle $\phi$n on column m values corresponding to elements of FIG. 3, described above. In each SPC cycle, CORDIC sub-engine 221 processes one column at the input of MIMO MEQ 212. For an exemplary 11-iteration structured-pipelined CORDIC, 12 subcarriers are processed in four SPC cycles. In at least one embodiment, at the first permutation, 7 of 16 structured-pipelined CORDICS require no input selection and 9 of 16 structured-pipelined CORDICs use 2-to-1 input selection for better hardware reuse.

In addition, CORDIC engine 220 includes 12 (i.e., $M_{MAX} \times N_{SS\_MAX}-1$) structured-pipelined CORDICS that perform the $2^{nd}$-$4^{th}$ permutations of QR decomposition for the 4×4 channel matrix. Those 12 structured-pipelined CORDICs perform 45 CORDIC operations with a reuse rate of four. That is, in every four SPC cycles, the structured-pipelined CORDIC repeats its operation. In at least one embodiment, all twelve of the structured-pipelined CORDICs use 4-to-1 input selection for improved hardware reuse. In FIGS. 11C and 11D, the bolded entries are associated with a first group of 12 subcarriers and other entries are associated with the following groups of subcarriers, α refers to self-angle operation on one value, and β refers to cross-angle operation between two different rows, αn,m refers to operation to generate αn, if underlined, or rotation operation of an on column m of resulting matrix R of the first permutation of QR decomposition of the channel matrix and entries correspond to elements of FIGS. 4-6, described above.

Referring to FIGS. 7-10, 12A and 12B, in at least one embodiment, control signals for each structured-pipelined CORDIC of a CORDIC engine designed for $M_{MAX}=N_{SS\_MAX}=4$ are generated by two levels of control signals. The first level of control signals, MEQ_STATE[4:0], BST_CNT[6:0], REUSE_CYC[1:0], and SPC_CNT are derived from MEQ state encoder and table controller 1002. In at least one embodiment, MEQ state encoder and table controller 1002 receives configuration information regarding enabled modes of the receiver and encodes the configuration in MEQ_STATE[4:0]. For example, control signal MEQ_STATE[4:0] provides a configuration state selected from the supported states based on a number of receiver antennas M, number of spatial streams $N_{SS}$, training field or data symbols in received signal $Y_{RX}$, space-time block coding (STBC), and non-contiguous 80+80 MHz bandwidth support. However, in other embodiments, other modes of operation may be encoded for generating control signals for configuring structured-pipelined CORDICs accordingly. In at least one embodiment, MEQ state encoder and table controller 1002 also generates counter values BTS_CNT[6:0], REUSE_CYC[1:0], and SPC_CNT for the detailed control of each structured-pipelined CORDIC at every SPC cycle. For example, MEQ state encoder and table controller 1002 includes an SPC cycle counter, a burst counter, and a re-use counter. SPC cycle counter is used to determine overall enable encompassing each structured-pipelined CORDIC of the CORDIC engine in the MIMO MEQ to cover all of the subcarrier processing. The burst counter selects channel matrices for subsets of the OFDM subcarriers for overlapping in the MIMO MEQ at the same time. Channel matrices for different subsets of OFDM subcarriers are received in different burst cycles. The re-use counter representing the different phase of operation within a burst at a selected structured-pipelined CORDIC, is used to generate control signals of the structured-pipelined CORDIC to share resources.

The second level of control signals for each structured-pipelined CORDIC is generated in SPC control generation table 1004, which uses MEQ_STATE[4:0], BST_CNT[6:0], REUSE_CYC[1:0], and SPC_CNT counter values to provide control signals for multiple structured-pipelined CORDICs at a time (e.g., structured-pipelined CORDICs 1-4 can share the same control signals for a first permutation off QR decomposition). The control signals generate control signal EN of corresponding structured-pipelined CORDICs in each row of the table to support the number of receiver antennas configured from the maximum number that is supported. The control signals configure each structured-pipelined CORDIC in a vector mode, rotation mode, delay pipe mode or storage unit mode of operation, described above, according to the corresponding EN, LP, ISEL, and BP control signals, respectively.

Figure 10:
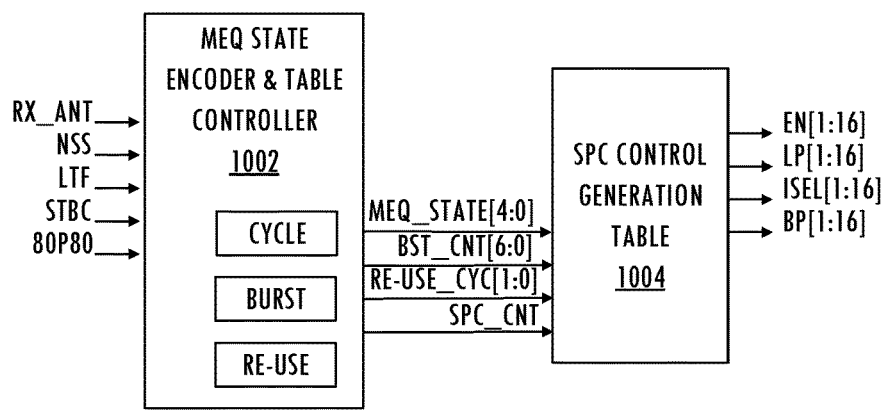
FIG. 10 illustrates a functional block diagram of control circuitry of a matrix equalizer, consistent with at least one embodiment of the invention.

FIGS. 10, 12A and 12B illustrate operations for a simplified example of structured-pipelined CORDIC control signals stored in SPC control generation table 1004 for a first permutation of a 3×2 matrix QR operation, where $M_{MAX}=4$ and $N_{SS\_MAX}=4$. An entry of EN0 indicates that the structured-pipelined CORDIC operation is disabled for the corresponding SPC cycle. BP indicates that the structured-pipelined CORDIC is configured in bypass mode for the corresponding SPC cycle. An entry of disabled structured-pipelined CORDICs reduce power consumption in configurations that use $N_{SS}$ where $N_{SS}<N_{SS\_MAX}$ or $M<M_{MAX}$. Values of EN, LP, BP, and ISEL that correspond to operations of 12A and 12B form vector 'bbbb' (where 'b' is '0' or '1') for corresponding entries in FIGS. 13A and 13B. For those structured-pipelined CORDICs that are not enabled, EN0 indicates values of '0000'. The EN signal is delayed by the pipeline to achieve precise clock gating for power savings. For those structured-pipelined CORDICs that are enabled, the EN bit is set (e.g., '1bbb'). When the EN bit is clear (e.g., '0bbb'), the structured-pipelined CORDIC is configured as a storage unit and achieves power savings. In bypass mode, the BP bit is set (e.g., '111b'). If the LP bit is set (e.g., '110b'), then rotation mode of operation is selected. The encodings are exemplary only and in other embodiment, other encodings are used. If the ISEL bit is set (e.g., 'bbb1'), then select circuits 704, 706, and 708 provide a corresponding input to the first CORDIC state of the structured-pipelined CORDIC. The ISEL signal controls usage-based multiplexing for resource sharing. Other configurations of structured-pipelined CORDICs have corresponding control tables that may be coded by look-up table or stored in memory and accessed by MEQ state encoder and table controller 1002 to generate suitable control signals.

Thus, structured-pipelined CORDIC techniques that efficiently perform various operations and support different parameters for MIMO MEQ processing have been described. The structured-pipelined CORDIC techniques simplify signal processing flow, unify input requirements, and output delay, and simplify integration. Look-up table techniques allow quick generation of control signals, reduce design and verification efforts, and facilitate design automation. In addition, the structured-pipelined CORDIC techniques are conducive to hardware sharing and reuse. The structured-pipelined CORDIC techniques reduce integrated circuit area and power consumption.

In at least one embodiment, a MIMO OFDM receiver includes a structured-pipelined CORDIC configured to generate an output real signal, an output imaginary signal, and an output rotation signal. The structured-pipelined CORDIC includes a first input selection circuit configured to output a first input real signal selected from M input real signals according to an input selection signal, a second input selection circuit configured to output a first input imaginary signal selected from M input imaginary signals according to the input selection signal, a third input selection circuit configured to output a first input rotation signal selected from the M−1 input rotation signals and the output rotation signal according to the input selection signal, and I CORDIC stages coupled in series, where M is an integer greater than zero. The I CORDIC stages coupled in series include a first CORDIC stage configured to receive the first input real signal, the first input imaginary signal, the first input rotation signal, and an input control signal, and I−1 additional CORDIC stages. Each of the I−1 additional CORDIC stage are configured to receive a corresponding output real signal, a corresponding output imaginary signal, a corresponding output rotation signal, and a corresponding stored control signal of a prior adjacent CORDIC stage of the I CORDIC stages. The output real signal, the output imaginary signal, and the output rotation signal are based on a last output real signal, a last output imaginary signal, a last output rotation signal, respectively, generated by a last CORDIC stage of the I−1 additional CORDIC stages.

The input control signal may be used to sequentially configure each of the I CORDIC stages to operate in a mode selected from a rotation mode, a vector mode, a bypass mode, and a storage mode. The MIMO OFDM receiver may include a MIMO MEQ including a plurality of structured-pipelined CORDICs. The structured-pipelined CORDIC may be included in the plurality of structured-pipelined CORDICs. The MIMO OFDM receiver may include a control circuit configured to generate the input control signal for operation of each structured-pipeline CORDIC of the MIMO MEQ based on an encoded state signal, a cycle count value, a burst count value, and a re-use cycle count value. The plurality of structured-pipelined CORDICs are grouped by permutation operation of a QR decomposition of a channel matrix and are configured to generate $N_{SS}$ inverse channel matrices for a corresponding subcarrier of an OFDM signal. The MIMO OFDM receiver may include a control circuit configured to sequentially cause the plurality of structured-pipelined CORDICs to perform $N_{SS}$ permutations of a QR decomposition to generate $N_{SS}$ inverse channel matrices based on a channel matrix. The channel matrix may be an $M \times N_{SS}$ matrix, wherein $N_{SS}$ is a number of information streams received in a received packet received by the M antennas of the receiver, $N_{SS} \leq N_{SS\_MAX}$, $M \leq M_{MAX}$, $M \geq N_{SS}$, $N_{SS\_MAX}$ a maximum number of information streams supported by the MIMO OFDM receiver, and $M_{MAX}$ is a maximum number of receiver antennas supported by the MIMO OFDM receiver. In at least one embodiment, $N_{SS} < N_{SS\_MAX}$ and $M < M_{MAX}$.

The MIMO MEQ may include a control circuit configured to apply an $M \times N_{SS}$ inverse channel matrix to a received signal using the plurality of structured-pipelined CORDICs. The MIMO Matrix Equalizer may include a plurality of first structured-pipelined CORDICs associated with a first permutation of a QR decomposition and configured to generate a first upper triangular matrix based on an $M \times N_{SS}$ channel matrix and a first select circuit configured to provide a first submatrix selected from a plurality of submatrices of the first upper triangular matrix based on $N_{SS}$. The MIMO MEQ may include a plurality of second structured-pipelined CORDICs associated with a second permutation of the QR decomposition and configured to generate a second upper triangular matrix based on the first submatrix and the first upper triangular matrix and a second select circuit configured to provide a second submatrix selected from a plurality of second submatrices of the first upper triangular matrix based on $N_{SS}$. The MIMO MEQ may include a plurality of third structured-pipelined CORDICs associated with a third permutation of the QR decomposition and configured to generate a third upper triangular matrix based on the second submatrix and the first upper triangular matrix and a plurality of fourth structured-pipelined CORDICs associated with a fourth permutation of the QR decomposition and configured to generate a fourth upper triangular matrix based on the first upper triangular matrix. The structured-pipelined CORDIC may be included in the plurality of first structured-pipelined CORDICs.

In at least one embodiment, a method for operating a MIMO OFDM receiver includes generating an output real signal, an output imaginary signal, and an output rotation signal by performing a structured-pipelined CORDIC operation. The structured-pipelined CORDIC operation includes selecting a first input real signal from M input real signals according to an input selection signal, where M is an integer greater than one, and selecting a first input imaginary signal from M input imaginary signals according to the input selection signal. The structured-pipelined CORDIC operation includes selecting a first input rotation signal from M−1 input rotation signals and the output rotation signal according to the input selection signal. The structured-pipelined CORDIC operation includes performing I iterations of a CORDIC operation. The performing includes performing a first iteration of the CORDIC operation on the first input real signal, the first input imaginary signal, and the first input rotation signal according to an input control signal. The performing includes performing I−1 additional iterations of the CORDIC operation, each of the I−1 additional CORDIC operations including receiving a corresponding output real signal, a corresponding output imaginary signal, a corresponding output rotation signal, and a corresponding stored control signal of a prior contiguous CORDIC operation of the I CORDIC operations. The output real signal, the output imaginary signal, and the output rotation signal are based on a last output real signal, a last output imaginary signal, a last output rotation signal, respectively, generated by a last CORDIC operation of the I−1 additional CORDIC operations.

The method may include selecting the CORDIC operation from a rotation operation, a vector operation, a bypass operation, and a storage operation. The method may include determining $N_{SS}$ upper triangular matrices based on an $M \times N_{SS}$ channel matrix. $N_{SS}$ may be a second integer greater than one and M may be greater than or equal to $N_{SS}$. $N_{SS}$ may equal four and M may equal four. The determining may include performing structured-pipelined CORDIC operations with a reuse rate of four. The determining may include performing a first permutation of a QR decomposition to obtain a first upper triangular matrix as a first result of the first permutation. The determining may include performing a second permutation of the QR decomposition using entries of the first result to obtain a second upper triangular matrix as a second result of the second permutation. The determining may include performing a third permutation of the QR decomposition using entries of the first result to obtain a third upper triangular matrix as a third result of the third permutation. The determining may include performing a fourth permutation of the QR decomposition using entries of the first result to obtain a fourth upper triangular matrix as a fourth result of the fourth permutation. The method may include, for each subcarrier of an OFDM symbol, determining an $M \times N_{SS}$ inverse channel matrix by using $M_{MAX} \times N_{SS\_MAX}$ structured-pipelined CORDIC operations. The method may include, for each subcarrier of an OFDM symbol, performing $M \times N_{SS}$ Multiple-Input, Multiple-Output (MIMO) Matrix Equalization using structured-pipelined CORDIC operations.

In at least one embodiment, a method for matrix equalization in a MIMO OFDM receiver includes for each subcarrier of an OFDM signal, determining $N_{SS}$ upper triangular matrices of a channel matrix by using structured-pipelined CORDICs. The channel matrix is an $M \times N_{SS}$ matrix, M is a number of receiver antennas used to receive a received packet by the receiver, $N_{SS}$ is a number of information streams received in the received packet, and $M \geq N_{SS}$.

For each subcarrier of an OFDM signal, determining the $N_{SS}$ upper triangular matrices may include performing QR decomposition of the channel matrix to generate an inverse channel matrix using the structured-pipelined CORDICs, each structured-pipelined CORDIC of the structured-pipelined CORDICs having I CORDIC stages, where I is a positive integer. The method may include reusing the structured-pipelined CORDICs to determine additional $N_{SS}$ upper triangular matrices for each additional channel matrix of each additional subcarrier of a plurality of additional subcarriers. The method may include generating an output real signal, an output imaginary signal, and an output rotation signal by performing a structured-pipelined CORDIC operation by a structured-pipelined CORDIC of the structured pipelined CORDICs, performing the structured-pipelined CORDIC operation comprising selecting a first input real signal from M input real signals according to an input selection signal. M may be an integer greater than one. The performing may include selecting a first input imaginary signal from M input imaginary signals according to the input selection signal. The performing may include selecting a first input rotation signal from M−1 input rotation signals and the output rotation signal according to the input selection signal. The performing may include performing I iterations of a CORDIC operation. The performing may include performing a first iteration of the CORDIC operation on the first input real signal, the first input imaginary signal, and the first input rotation signal according to an input control signal. The performing may include performing I−1 additional iterations of the CORDIC operation, each of the I−1 additional CORDIC operations including receiving a corresponding output real signal, a corresponding output imaginary signal, a corresponding output rotation signal, and a corresponding stored control signal of a prior contiguous CORDIC operation of the I CORDIC operations. The output real signal, the output imaginary signal, and the output rotation signal are based on a last output real signal, a last output imaginary signal, a last output rotation signal, respectively, generated by a last CORDIC operation of the I−1 additional CORDIC operations.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

Although the invention is described herein with reference to specific embodiments, various modifications and changes can be made without departing from the scope of the present invention as set forth in the claims below. For example, while the structured-pipelined CORDIC techniques are described with reference to IEEE standard 802.11, techniques described herein can be adapted to other communication protocols. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A Multiple-Input, Multiple-Output (MIMO) Orthogonal Frequency-Division Multiplexing (OFDM) receiver comprising:
 a structured-pipelined COordinate Rotation Digital Computer (CORDIC) configured to generate an output real signal, an output imaginary signal, and an output rotation signal, the structured-pipelined CORDIC comprising:
  a first input selection circuit configured to output a first input real signal selected from M input real signals according to an input selection signal where M is an integer greater than zero;
  a second input selection circuit configured to output a first input imaginary signal selected from M input imaginary signals according to the input selection signal;
  a third input selection circuit configured to output a first input rotation signal selected from M−1 input rotation signals and the output rotation signal according to the input selection signal; and
 I CORDIC stages coupled in series comprising:
  a first CORDIC stage configured to receive the first input real signal, the first input imaginary signal, the first input rotation signal, and an input control signal, and
  I−1 additional CORDIC stages, each of the I−1 additional CORDIC stage being configured to receive a corresponding output real signal, a corresponding output imaginary signal, a corresponding output rotation signal, and a corresponding stored control signal of a prior adjacent CORDIC stage of the I CORDIC stages,
 wherein the output real signal, the output imaginary signal, and the output rotation signal are based on a last output real signal, a last output imaginary signal, a last output rotation signal, respectively, generated by a last CORDIC stage of the I−1 additional CORDIC stages, where I is a second integer greater than one.

2. The MIMO OFDM receiver, as recited in claim 1, wherein the input control signal is used to sequentially configure each of the I CORDIC stages to operate in a mode selected from a rotation mode, a vector mode, a bypass mode, and a storage mode.

3. The MIMO OFDM receiver, as recited in claim 1, further comprising:
 a MIMO Matrix Equalizer (MEQ) comprising a plurality of structured-pipelined CORDICs, the structured-pipelined CORDIC being included in the plurality of structured-pipelined CORDICs.

4. The MIMO OFDM receiver, as recited in claim 3, further comprising:
 a control circuit configured to generate the input control signal for operation of each structured-pipeline CORDIC of the MIMO MEQ based on an encoded state signal, a cycle count value, a burst count value, and a re-use cycle count value.

5. The MIMO OFDM receiver, as recited in claim 3, wherein the plurality of structured-pipelined CORDICs are grouped by permutation operation of a QR decomposition of a channel matrix and are configured to generate $N_{SS}$ inverse channel matrices for a corresponding subcarrier of an OFDM signal.

6. The MIMO OFDM receiver, as recited in claim 3, further comprising:
a control circuit configured to sequentially cause the plurality of structured-pipelined CORDICs to perform $N_{SS}$ permutations of a QR decomposition to generate $N_{SS}$ inverse channel matrices based on a channel matrix, the channel matrix being an $M \times N_{SS}$ matrix,
wherein $N_{SS}$ is a number of information streams received in a received packet received by M antennas of the receiver, $N_{SS} \leq N_{SS\_MAX}$, $M \leq M_{MAX}$, $M \geq N_{SS}$, $N_{SS\_MAX}$ is a maximum number of information streams supported by the MIMO OFDM receiver, and $M_{MAX}$ is a maximum number of receiver antennas supported by the MIMO OFDM receiver.

7. The MIMO OFDM receiver, as recited in claim 6, wherein $N_{SS} < N_{SS\_MAX}$ and $M < M_{MAX}$.

8. The MIMO OFDM receiver, as recited in claim 3, wherein the MIMO MEQ further comprises:
a control circuit configured to apply an $M \times N_{SS}$ inverse channel matrix to a received signal using the plurality of structured-pipelined CORDICs,
wherein $N_{SS} \leq N_{SS\_MAX}$ and $M \leq M_{MAX}$, M is a number of receiver antennas used to receive the received signal, $N_{SS}$ is a number of information streams received in the received signal, and $M \geq N_{SS}$, $N_{SS\_MAX}$ is a maximum number of information streams supported by the MIMO MEQ, and $M_{MAX}$ is a maximum number of receiver antennas supported by the MIMO MEQ.

9. The MIMO OFDM receiver, as recited in claim 1, further comprising:
a MIMO Matrix Equalizer (MEQ) comprising a plurality of first structured-pipelined CORDICs associated with a first permutation of a QR decomposition and configured to generate a first upper triangular matrix based on an $M \times N_{SS}$ channel matrix, M being a number of receiver antennas, and $N_{SS}$ being a number of information streams received in a received packet;
a first select circuit configured to provide a first submatrix selected from a plurality of submatrices of the first upper triangular matrix based on $N_{SS}$;
a plurality of second structured-pipelined CORDICs associated with a second permutation of the QR decomposition and configured to generate a second upper triangular matrix based on the first submatrix and the first upper triangular matrix;
a second select circuit configured to provide a second submatrix selected from a plurality of second submatrices of the first upper triangular matrix based on $N_{SS}$;
a plurality of third structured-pipelined CORDICs associated with a third permutation of the QR decomposition and configured to generate a third upper triangular matrix based on the second submatrix and the first upper triangular matrix; and
a plurality of fourth structured-pipelined CORDICs associated with a fourth permutation of the QR decomposition and configured to generate a fourth upper triangular matrix based on the first upper triangular matrix,
wherein the structured-pipelined CORDIC is included in the plurality of first structured-pipelined CORDICs.

10. A method for operating A Multiple-Input, Multiple-Output (MIMO) Orthogonal Frequency-Division Multiplexing (OFDM) receiver, the method comprising:
generating an output real signal, an output imaginary signal, and an output rotation signal by performing a structured-pipelined CORDIC operation comprising:
selecting a first input real signal from M input real signals according to an input selection signal, where M is an integer greater than one;
selecting a first input imaginary signal from M input imaginary signals according to the input selection signal;
selecting a first input rotation signal from M−1 input rotation signals and the output rotation signal according to the input selection signal;
performing I iterations of a CORDIC operation comprising:
performing a first iteration of the CORDIC operation on the first input real signal, the first input imaginary signal, and the first input rotation signal according to an input control signal; and
performing I−1 additional iterations of the CORDIC operation, each of the I−1 additional CORDIC operations including receiving a corresponding output real signal, a corresponding output imaginary signal, a corresponding output rotation signal, and a corresponding stored control signal of a prior contiguous CORDIC operation of the I CORDIC operations,
wherein the output real signal, the output imaginary signal, and the output rotation signal are based on a last output real signal, a last output imaginary signal, a last output rotation signal, respectively, generated by a last CORDIC operation of the I−1 additional CORDIC operations.

11. The method, as recited in claim 10, further comprising:
selecting the CORDIC operation is selected from a rotation operation, a vector operation, a bypass operation, and a storage operation.

12. The method, as recited in claim 10, further comprising:
determining $N_{SS}$ upper triangular matrices based on an $M \times N_{SS}$ channel matrix, $N_{SS}$ being a second integer greater than one and M being greater than or equal to $N_{SS}$,
wherein the determining includes performing the structured pipeline CORDIC operation.

13. The method, as recited in claim 12, wherein $N_{SS}$ equals four and M equals four and the determining includes performing structured-pipelined CORDIC operations with a reuse rate of four.

14. The method, as recited in claim 12, wherein $N_{SS}$ equals four and M equals four, and the determining comprises:
performing a first permutation of a QR decomposition to obtain a first upper triangular matrix as a first result of the first permutation;
performing a second permutation of the QR decomposition using entries of the first result to obtain a second upper triangular matrix as a second result of the second permutation;
performing a third permutation of the QR decomposition using entries of the first result to obtain a third upper triangular matrix as a third result of the third permutation; and performing a fourth permutation of the QR decomposition using entries of the first result to obtain a fourth upper triangular matrix as a fourth result of the fourth permutation.

15. The method, as recited in claim 10, further comprising:
for each subcarrier of an OFDM symbol, determining an $M \times N_{SS}$ inverse channel matrix by using $M_{MAX} \times N_{SS\_MAX}$ structured-pipeline CORDIC operations, wherein $N_{SS} \leq N_{SS\_MAX}$ and $M \leq M_{MAX}$, M is a number of receiver antennas used to receive a received packet, $N_{SS}$ is a number of information streams received in the received packet, and $M \geq N_{SS}$,
where $N_{SS\_MAX}$ is a maximum number of information streams supported by a MIMO OFDM receiver, and $M_{MAX}$ is a maximum number of receiver antennas supported by the MIMO OFDM receiver.

16. The method, as recited in claim 10, further comprising:
for each subcarrier of an OFDM symbol, performing $M \times N_{SS}$ Multiple-Input, Multiple-Output (MIMO) matrix equalization using structured-pipelined CORDIC operations,
wherein M is a number of receiver antennas used to receive a received packet, $N_{SS}$ is a number of information streams received in the received packet, and $M \geq N_{SS}$.

17. A method for matrix equalization in a Multiple-Input, Multiple-Output (MIMO) Orthogonal Frequency-Division Multiplexing (OFDM) receiver comprising:
for each subcarrier of an OFDM signal, determining $N_{SS}$ upper triangular matrices of a channel matrix by using structured-pipelined CORDICs,
wherein the channel matrix is an $M \times N_{SS}$ matrix, M is a number of receiver antennas used to receive a received packet by the receiver, $N_{SS}$ is a number of information streams received in the received packet, and $M \geq N_{SS}$;
generating an output real signal, an output imaginary signal, and an output rotation signal by performing a structured-pipelined CORDIC operation by a structured-pipelined CORDIC of the structured pipelined CORDICs, performing the structured-pipelined CORDIC operation comprising
generating an output real signal, an output imaginary signal, and an output rotation signal by performing a structured-pipelined CORDIC operation comprising:
selecting a first input real signal from M input real signals according to an input selection signal, where M is an integer greater than one;
selecting a first input imaginary signal from M input imaginary signals according to the input selection signal;
selecting a first input rotation signal from M−1 input rotation signals and the output rotation signal according to the input selection signal.

18. The method, as recited in claim 17, wherein determining the $N_{SS}$ upper triangular matrices includes performing CORDIC operations with a reuse rate of four.

19. The method, as recited in claim 17, further comprising:
reusing the structured-pipelined CORDICs to determine additional $N_{SS}$ upper triangular matrices for each additional channel matrix of each additional subcarrier of a plurality of additional subcarriers.

20. The method, as recited in claim 17, further comprising:
performing I iterations of a CORDIC operation comprising:
performing a first iteration of the CORDIC operation on the first input real signal, the first input imaginary signal, and the first input rotation signal according to an input control signal; and
performing I−1 additional iterations of the CORDIC operation, each of the I−1 additional CORDIC operations including receiving a corresponding output real signal, a corresponding output imaginary signal, a corresponding output rotation signal, and a corresponding stored control signal of a prior contiguous CORDIC operation of the I CORDIC operations,
wherein the output real signal, the output imaginary signal, and the output rotation signal are based on a last output real signal, a last output imaginary signal, a last output rotation signal, respectively, generated by a last CORDIC operation of the I−1 additional CORDIC operations.

* * * * *